United States Patent
Lee et al.

(10) Patent No.: US 11,363,478 B2
(45) Date of Patent: Jun. 14, 2022

(54) ADAPTIVE MONITORING

(71) Applicant: QUALCOMM Incorporated, San Diego, CA (US)

(72) Inventors: Heechoon Lee, San Diego, CA (US); Hung Dinh Ly, San Diego, CA (US); Yeliz Tokgoz, San Diego, CA (US); Tingfang Ji, San Diego, CA (US); Wanshi Chen, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/503,980

(22) Filed: Jul. 5, 2019

(65) Prior Publication Data
US 2020/0022011 A1   Jan. 16, 2020

Related U.S. Application Data

(60) Provisional application No. 62/696,273, filed on Jul. 10, 2018.

(51) Int. Cl.
*H04W 24/10* (2009.01)
*H04B 17/11* (2015.01)
(Continued)

(52) U.S. Cl.
CPC ............ *H04W 24/10* (2013.01); *H04B 17/11* (2015.01); *H04B 17/21* (2015.01); *H04B 17/391* (2015.01); *H04L 1/1607* (2013.01); *H04W 76/28* (2018.02)

(58) Field of Classification Search
CPC ..... H04W 24/10; H04W 24/08; H04W 76/28; H04B 17/11; H04B 17/391; H04B 17/21; H04B 17/24; H04L 1/1607
See application file for complete search history.

(56) References Cited

U.S. PATENT DOCUMENTS

| | | | | |
|---|---|---|---|---|
| 9,008,200 | B2* | 4/2015 | Simonsson | ........... H04W 24/08 |
| | | | | 375/260 |
| 2015/0373597 | A1* | 12/2015 | Kim | .................. H04W 36/0016 |
| | | | | 455/436 |

(Continued)

FOREIGN PATENT DOCUMENTS

| | | |
|---|---|---|
| EP | 2536206 A1 | 12/2012 |
| EP | 2854440 A1 | 4/2015 |

OTHER PUBLICATIONS

Huawei et al: "Independent and Joint Control of CSI-RS Transmission and CSI Reporting for MIMO," 3GPP Draft; R1-1700056, 3rd Generation Partnership Project (3GPP), Mobile Competence Centre; 650, Route Des Lucioles; F-06921 Sophia-Antipolis Cedex; France, vol. RAN WG1, no. Spokane, USA; Jan. 16, 2017-Jan. 20, 2017, Jan. 16, 2017, XP051207598, 5 pages, Retrieved from the Internet: URL: http://www.3gpp.org/ftp/Meetings_3GPP_SYNC/RAN1/Docs/ [retrieved on Jan. 16, 2017] Subclause 3.3; p. 3 Section 4; p. 3-p. 4; figure 4.

(Continued)

*Primary Examiner* — Habte Mered
(74) *Attorney, Agent, or Firm* — Holland & Hart LLP

(57) ABSTRACT

Methods, systems, and devices for wireless communications are described. A user equipment (UE) may receive, from a base station, a first message indicating a plurality of measurement configurations, each measurement configuration of the plurality of measurement configurations may include different sets of measurement parameters used for measuring a reference signal (RS) of a cell. The UE may also receive, from the base station, a second message indicating that the UE activate a first measurement configuration, deactivate the first measurement configuration, or switch to the first measurement configuration, where the first measurement configuration is from the plurality of measurement configurations. The UE may determine a measurement reporting (Continued)

scheme based at least in part on the indication to activate, deactivate, or switch to the first measurement configuration.

30 Claims, 21 Drawing Sheets

(51) Int. Cl.
*H04W 76/28* (2018.01)
*H04B 17/391* (2015.01)
*H04L 1/16* (2006.01)
*H04B 17/21* (2015.01)

(56) References Cited

U.S. PATENT DOCUMENTS

| | | | | |
|---|---|---|---|---|
| 2018/0213427 | A1* | 7/2018 | Uemura | H04W 24/10 |
| 2019/0044689 | A1* | 2/2019 | Yiu | H04W 72/042 |
| 2019/0141555 | A1* | 5/2019 | Tooher | H04L 5/0053 |
| 2019/0150013 | A1* | 5/2019 | Zhang | H04W 24/10 |
| | | | | 375/224 |
| 2019/0182000 | A1* | 6/2019 | Futaki | H04L 5/005 |
| 2019/0261444 | A1* | 8/2019 | Axmon | H04W 76/28 |
| 2019/0274146 | A1* | 9/2019 | Tang | H04W 36/0088 |
| 2019/0393969 | A1* | 12/2019 | Kim | H04L 5/0037 |
| 2020/0136878 | A1* | 4/2020 | Yi | H04W 24/10 |
| 2021/0167930 | A1* | 6/2021 | Jeon | H04L 5/0094 |

OTHER PUBLICATIONS

Nokia et al: "Measurement Configuration in NR with BWP, RRM and Beams," 3GPP Draft; R2-1711063 Measurement Configuration in NR With BWP, RRM and Beams, 3rd Generation Partnership Project (3GPP), Mobile Competence Centre; 650, Route Des Lucioles; F-06921 Sophia-Antipolis, vol. RAN WG2, no. Prague, Czech Republic; Oct. 9, 2017-Oct. 13, 2017, Oct. 8, 2017, XP051343071, 4 Pages, Retrieved from the Internet: URL: http://www.3gpp.org/ftp/Meetings_3GPP_SYNC/RAN2/Docs/ [retrieved on Oct. 8, 2017] section 2.

Partial International Search Report—PCT/US2019/040777—ISA/EPO—dated Oct. 2, 2019.

Samsung: "RRM Measurement Configuration for BWP," 3GPP Draft; R2-1805849 RRM Measurement Configuration for BWP, 3rd Generation Partnership Project (3GPP), Mobile Competence Centre; 650, Route Des Lucioles; F-06921 Sophia-Antipolis Cedex; France, vol. RAN WG2, No. Sanya, China; Apr. 16, 2018-Apr. 20, 2018, Apr. 14, 2018, XP051429465, 5 Pages, Retrieved from the Internet: URL: http://www.3gpp.org/ftp/Meetings%5F3GPP%5FSYNC/RAN2/Docs/ [retrieved on Apr. 14, 2018] p. 2-p. 4; figure 2.

International Search Report and Written Opinion—PCT/US2019/040777—ISA/EPO—dated Nov. 27, 2019.

* cited by examiner

ADAPTIVE MONITORING

CROSS REFERENCE

The present Application for Patent claims the benefit of U.S. Provisional Patent Application No. 62/696,273 by Lee et al., entitled "ADAPTIVE MONITORING," filed Jul. 10, 2018, assigned to the assignee hereof, and expressly incorporated by reference in its entirety.

BACKGROUND

The following relates generally to wireless communications, and more specifically to adaptive monitoring.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges (e.g., 28 GHz, 40 GHz, 60 GHz, etc.). Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Channel measurement and reporting techniques may be used within a wireless communication system to identify possible communication beams within a serving cell or a neighboring cell. For example, a base station and/or a UE may measure channel performance metrics for one or more transmit beams and transmit a feedback message reporting the results of the measurements. In some cases, there may be complex and time-dependent steps that a base station and/or UE must perform in order to obtain measurement reports. For example, respective beam measurements may involve different operations for measuring different types of reference signals, which may vary based on the type of beam measurement being performed. Further, active communication beams that are monitored may change more frequently based on mobility of the device performing the measurements, and the measurements may not have a clearly defined timeframe established for measurement reporting. As such, conventional techniques may result in excessive signaling, unnecessary measurements, scheduling restrictions, unnecessary power consumption, and/or time delays and ambiguous timeframes for obtaining a measurement report.

SUMMARY

The described techniques relate to improved methods, systems, devices, and apparatuses that support adaptive monitoring. Generally, the described techniques provide for dynamic modifications to reference signal (RS) measurement configurations, which may be continually adapted based on the condition of the UE (e.g., the UE's mobility, channel quality experienced at the UE, a discontinuous reception (DRX) mode, etc.). The RS measurements based on the measurement configurations may be used for intra-cell or inter-cell channel quality measurements, and the RS measurements may be used for different types of measurements, such as beam management (BM), radio resource management (RRM), radio link monitoring (RLM), and channel tracking. In some cases, multiple measurement configurations may be provided to a UE. In such cases, each measurement configuration may include different sets of measurement parameters (e.g., measurement periodicity, offset, window size, etc.) used for measuring a RS of a cell (e.g., a serving cell, a neighboring cell, etc.). Accordingly, a UE configured with multiple measurement configurations may activate, deactivate, and/or switch between different measurement configurations implicitly or based on explicit signaling from a base station. For instance, the base station may dynamically indicate (e.g., using downlink control information (DCI), a medium access control (MAC) control element (CE), or the like) that the UE active, deactivate, or switch to a selected measurement configuration of the multiple measurement configurations. In some examples, the explicit signaling of the selected measurement configuration may be based on sub-sampling rules for a particular measurement configuration, where a periodicity and/or measurement occasions may be adjusted based on the sub-sampling results and channel conditions at the UE (e.g., when operating at high mobility or poor beam quality conditions, etc.). Additionally or alternatively, a measurement configuration may be implicitly adapted or adjusted based on a DRX periodicity, where, for example, less frequent measurements or monitoring occasions may be utilized while the UE is in a DRX mode. In any event, the use of dynamic measurement configurations that are adapted to a UE's conditions or the cell's measurement needs may provide a clear timeline for measurements, reduce delay in communications (e.g., though avoiding scheduling restrictions), avoid excessive signaling, prevent unnecessary measurements, and the like.

A method of wireless communication at a UE is described. The method may include receiving, from a base station, a first message indicating a set of measurement configurations, each measurement configuration of the set of measurement configurations including different sets of measurement parameters used for measuring an RS of a cell, receiving, from the base station, a second message indicating that the UE activate a first measurement configuration, deactivate the first measurement configuration, or switch to the first measurement configuration, where the first measurement configuration is from the set of measurement configurations, and determining a measurement reporting scheme based on the indication to activate, deactivate, or switch to the first measurement configuration.

An apparatus for wireless communication at a UE is described. The apparatus may include a processor, memory coupled with the processor, and instructions stored in the memory. The instructions may be executable by the processor to cause the apparatus to receive, from a base station, a first message indicating a set of measurement configurations, each measurement configuration of the set of measurement configurations including different sets of measurement parameters used for measuring an RS of a cell, receive, from the base station, a second message indicating that the UE activate a first measurement configuration, deactivate the first measurement configuration, or switch to the first measurement configuration, where the first measurement configuration is from the set of measurement configurations, and determine a measurement reporting scheme based on the indication to activate, deactivate, or switch to the first measurement configuration.

Another apparatus for wireless communication at a UE is described. The apparatus may include means for receiving, from a base station, a first message indicating a set of measurement configurations, each measurement configuration of the set of measurement configurations including different sets of measurement parameters used for measuring an RS of a cell, receiving, from the base station, a second message indicating that the UE activate a first measurement configuration, deactivate the first measurement configuration, or switch to the first measurement configuration, where the first measurement configuration is from the set of measurement configurations, and determining a measurement reporting scheme based on the indication to activate, deactivate, or switch to the first measurement configuration.

A non-transitory computer-readable medium storing code for wireless communication at a UE is described. The code may include instructions executable by a processor to receive, from a base station, a first message indicating a set of measurement configurations, each measurement configuration of the set of measurement configurations including different sets of measurement parameters used for measuring an RS of a cell, receive, from the base station, a second message indicating that the UE activate a first measurement configuration, deactivate the first measurement configuration, or switch to the first measurement configuration, where the first measurement configuration is from the set of measurement configurations, and determine a measurement reporting scheme based on the indication to activate, deactivate, or switch to the first measurement configuration.

Some examples of the method, apparatuses, and non-transitory computer-readable medium described herein may further include operations, features, means, or instructions for determining a set of measurement parameters of the first measurement configuration based on the second message indicating that the UE activate the first measurement configuration, performing measurements of the RS in accordance with the determined set of measurement parameters, and transmitting a measurement report to the base station including measurements of the RS based on the measurement reporting scheme.

Some examples of the method, apparatuses, and non-transitory computer-readable medium described herein may further include operations, features, means, or instructions for identifying that the set of measurement parameters includes a synchronization signal block (SSB) measurement timing configuration (SMTC) window configuration selected from a set of SMTC window configurations, the SMTC window configuration including a SMTC window periodicity, or a SMTC window size, or a SMTC window offset, or a combination thereof.

Some examples of the method, apparatuses, and non-transitory computer-readable medium described herein may further include operations, features, means, or instructions for identifying that the set of measurement parameters includes a measurement gap configuration selected from a set of measurement gap configurations, the measurement gap configuration including a measurement gap periodicity, or a measurement gap size, or a combination thereof.

Some examples of the method, apparatuses, and non-transitory computer-readable medium described herein may further include operations, features, means, or instructions for identifying that the set of measurement parameters includes an RS measurement configuration for performing measurements of the RS of the cell, the RS measurement configuration including a measurement periodicity, or a measurement window size, or a combination thereof.

In some examples of the method, apparatuses, and non-transitory computer-readable medium described herein, the RS measurement configuration corresponds to a configuration of the RS of the cell or may be independent of the configuration of the RS of the cell. In some examples of the method, apparatuses, and non-transitory computer-readable medium described herein, the RS measurement configuration indicates different types of RSs to be measured.

Some examples of the method, apparatuses, and non-transitory computer-readable medium described herein may further include operations, features, means, or instructions for identifying that the set of measurement parameters includes a set of beams used for monitoring the RS, or an activation of inter-frequency measurements, or a deactivation of inter-frequency measurements, or a combination thereof.

Some examples of the method, apparatuses, and non-transitory computer-readable medium described herein may further include operations, features, means, or instructions for performing measurements of the RS using the first measurement configuration, and stopping measurements of the RS using the first measurement configuration based on the second message indicating that the UE deactivate the first measurement configuration.

Some examples of the method, apparatuses, and non-transitory computer-readable medium described herein may further include operations, features, means, or instructions for performing measurements of the RS using a second measurement configuration, switching to the first measurement configuration based on the second message indicating that the UE switch to the first measurement configuration, determining a set of measurement parameters of the first measurement configuration, where the set of measurement parameters of the first measurement configuration may be different from a set of measurement parameters of the second measurement configuration, performing measurements of the RS in accordance with the determined set of measurement parameters, and transmitting a measurement report to the base station including measurements of the RS based on the measurement reporting scheme.

In some examples of the method, apparatuses, and non-transitory computer-readable medium described herein, the first message indicating the set of measurement configurations includes indicating the first measurement configuration for measuring the RS of the cell, where the second message further indicates that the UE activate a first set of measurement parameters of the first measurement configuration, deactivate the first set of measurement parameters of the first measurement configuration, or switch to the first set of measurement parameters of the first measurement configuration, and where the determining the measurement reporting scheme may be based on the indication to activate, deactivate, or switch to the first set of measurement parameters.

Some examples of the method, apparatuses, and non-transitory computer-readable medium described herein may further include operations, features, means, or instructions for determining a periodicity of the first set of measurement parameters based on the second message indicating that the UE activate the first set of measurement parameters, performing measurements of the RS in accordance with the determined periodicity of the first set of measurement parameters, and transmitting a measurement report to the base station including measurements of the RS based on the measurement reporting scheme.

Some examples of the method, apparatuses, and non-transitory computer-readable medium described herein may further include operations, features, means, or instructions for determining one or more measurement occasions of the first set of measurement parameters based on the second message indicating that the UE activate the first set of measurement parameters, performing measurements of the RS in accordance with the determined one or more measurement occasions, and transmitting a measurement report to the base station including measurements of the RS based on the measurement reporting scheme.

Some examples of the method, apparatuses, and non-transitory computer-readable medium described herein may further include operations, features, means, or instructions for performing measurements of the RS using the first set of measurement parameters, and stopping measurements of the RS using the first set of measurement parameters based on the second message indicating that the UE deactivate the first set of measurement parameters.

Some examples of the method, apparatuses, and non-transitory computer-readable medium described herein may further include operations, features, means, or instructions for performing measurements of the RS using a second set of measurement parameters of the measurement configuration, switching from the second set of measurement parameters to the first set of measurement parameters based on the second message indicating that the UE switch to the first set of measurement parameters, where the first set of measurement parameters may have a different periodicity than a periodicity of the second set of measurement parameters, or may have a different one or more measurement occasions than measurement occasions of the second set of measurement parameters, or a combination thereof, performing measurements of the RS using the first set of measurement parameters, and transmitting a measurement report to the base station including measurements of the RS based on the measurement reporting scheme.

In some examples of the method, apparatuses, and non-transitory computer-readable medium described herein, receiving the second message may include operations, features, means, or instructions for receiving the second message via DCI, or via a medium access control (MAC) control element (CE), or via a different carrier, or via a different bandwidth part (BWP), or a combination thereof.

Some examples of the method, apparatuses, and non-transitory computer-readable medium described herein may further include operations, features, means, or instructions for transmitting an ACK in response to receiving the second message.

A method of wireless communication at a UE is described. The method may include receiving, from a base station, a message indicating a measurement configuration for measuring an RS of a cell, performing measurements of the RS in accordance with a first periodicity of the measurement configuration, entering into a DRX mode, and performing measurements of the RS of the cell in accordance with a second periodicity of the measurement configuration and based on the DRX mode, the first periodicity being different from the second periodicity.

An apparatus for wireless communication at a UE is described. The apparatus may include a processor, memory coupled with the processor, and instructions stored in the memory. The instructions may be executable by the processor to cause the apparatus to receive, from a base station, a message indicating a measurement configuration for measuring an RS of a cell, perform measurements of the RS in accordance with a first periodicity of the measurement configuration, enter into a DRX mode, and perform measurements of the RS of the cell in accordance with a second periodicity of the measurement configuration and based on the DRX mode, the first periodicity being different from the second periodicity.

Another apparatus for wireless communication at a UE is described. The apparatus may include means for receiving, from a base station, a message indicating a measurement configuration for measuring an RS of a cell, performing measurements of the RS in accordance with a first periodicity of the measurement configuration, entering into a DRX mode, and performing measurements of the RS of the cell in accordance with a second periodicity of the measurement configuration and based on the DRX mode, the first periodicity being different from the second periodicity.

A non-transitory computer-readable medium storing code for wireless communication at a UE is described. The code may include instructions executable by a processor to receive, from a base station, a message indicating a measurement configuration for measuring an RS of a cell, perform measurements of the RS in accordance with a first periodicity of the measurement configuration, enter into a DRX mode, and perform measurements of the RS of the cell in accordance with a second periodicity of the measurement configuration and based on the DRX mode, the first periodicity being different from the second periodicity.

Some examples of the method, apparatuses, and non-transitory computer-readable medium described herein may further include operations, features, means, or instructions for exiting the DRX mode, and performing measurements of the RS in accordance with the first periodicity, where the first periodicity may be shorter than the second periodicity.

In some examples of the method, apparatuses, and non-transitory computer-readable medium described herein, the second periodicity may be associated with a periodicity of the DRX mode.

Some examples of the method, apparatuses, and non-transitory computer-readable medium described herein may further include operations, features, means, or instructions for measurement occasions corresponding to the second periodicity may be based on a periodicity of the DRX mode.

A method of wireless communication at a base station is described. The method may include determining a set of measurement configurations, each measurement configuration of the set of measurement configurations including different sets of measurement parameters for a UE to measure an RS of a cell, determining communications conditions at the UE, selecting a first measurement configuration from the set of measurement configurations based on the determined communications conditions at the UE, and transmitting, to the UE, a message indicating that the UE activate the first measurement configuration, deactivate the first measurement configuration, or switch to the first measurement configuration.

An apparatus for wireless communication at a base station is described. The apparatus may include a processor, memory coupled with the processor, and instructions stored in the memory. The instructions may be executable by the processor to cause the apparatus to determine a set of measurement configurations, each measurement configuration of the set of measurement configurations including different sets of measurement parameters for a UE to measure an RS of a cell, determine communications conditions at the UE, select a first measurement configuration from the set of measurement configurations based on the determined communications conditions at the UE, and transmit, to the UE, a message indicating that the UE activate the first measurement configuration, deactivate the first measurement configuration, or switch to the first measurement configuration.

Another apparatus for wireless communication at a base station is described. The apparatus may include means for determining a set of measurement configurations, each measurement configuration of the set of measurement configurations including different sets of measurement parameters for a UE to measure an RS of a cell, determining communications conditions at the UE, selecting a first measurement configuration from the set of measurement configurations based on the determined communications conditions at the UE, and transmitting, to the UE, a message indicating that the UE activate the first measurement configuration, deactivate the first measurement configuration, or switch to the first measurement configuration.

A non-transitory computer-readable medium storing code for wireless communication at a base station is described. The code may include instructions executable by a processor to determine a set of measurement configurations, each measurement configuration of the set of measurement configurations including different sets of measurement parameters for a UE to measure an RS of a cell, determine communications conditions at the LTE, select a first measurement configuration from the set of measurement configurations based on the determined communications conditions at the UE, and transmit, to the UE, a message indicating that the UE activate the first measurement configuration, deactivate the first measurement configuration, or switch to the first measurement configuration.

Some examples of the method, apparatuses, and non-transitory computer-readable medium described herein may further include operations, features, means, or instructions for transmitting, to the UE, a first message indicating the set of measurement configurations, where the first message may be transmitted via radio resource control (RRC) signaling.

Some examples of the method, apparatuses, and non-transitory computer-readable medium described herein may further include operations, features, means, or instructions for receiving, from the UE, a measurement report based on a set of measurement parameters of the first measurement configuration, where the message indicates that the UE activate the first measurement configuration.

In some examples of the method, apparatuses, and non-transitory computer-readable medium described herein, the set of measurement parameters includes an SMTC window configuration selected from a set of SMTC window configurations, the first SMTC window configuration including a SMTC window periodicity, or a SMTC window size, or a SMTC window offset, or a combination thereof.

In some examples of the method, apparatuses, and non-transitory computer-readable medium described herein, the set of measurement parameters includes a first measurement gap configuration selected from a set of measurement gap configurations, the first measurement gap configuration including a measurement gap periodicity, or a measurement gap size, or a combination thereof.

In some examples of the method, apparatuses, and non-transitory computer-readable medium described herein, the set of measurement parameters includes an RS measurement configuration for performing measurements of the RS of the cell, the RS measurement configuration including a measurement periodicity, or a measurement window size, or a combination thereof.

In some examples of the method, apparatuses, and non-transitory computer-readable medium described herein, the set of measurement parameters includes a set of beams used for monitoring the RS, or an activation of inter-frequency measurements, or a deactivation of inter-frequency measurements, or a combination thereof.

Some examples of the method, apparatuses, and non-transitory computer-readable medium described herein may further include operations, features, means, or instructions for receiving, from the UE, a first measurement report based on a set of measurement parameters of a second measurement configuration, and receiving, from the UE, a second measurement report based on a set of measurement parameters of the first measurement configuration, where the message indicates that the UE switch to the first measurement configuration.

DETAILED DESCRIPTION

Figure 1:
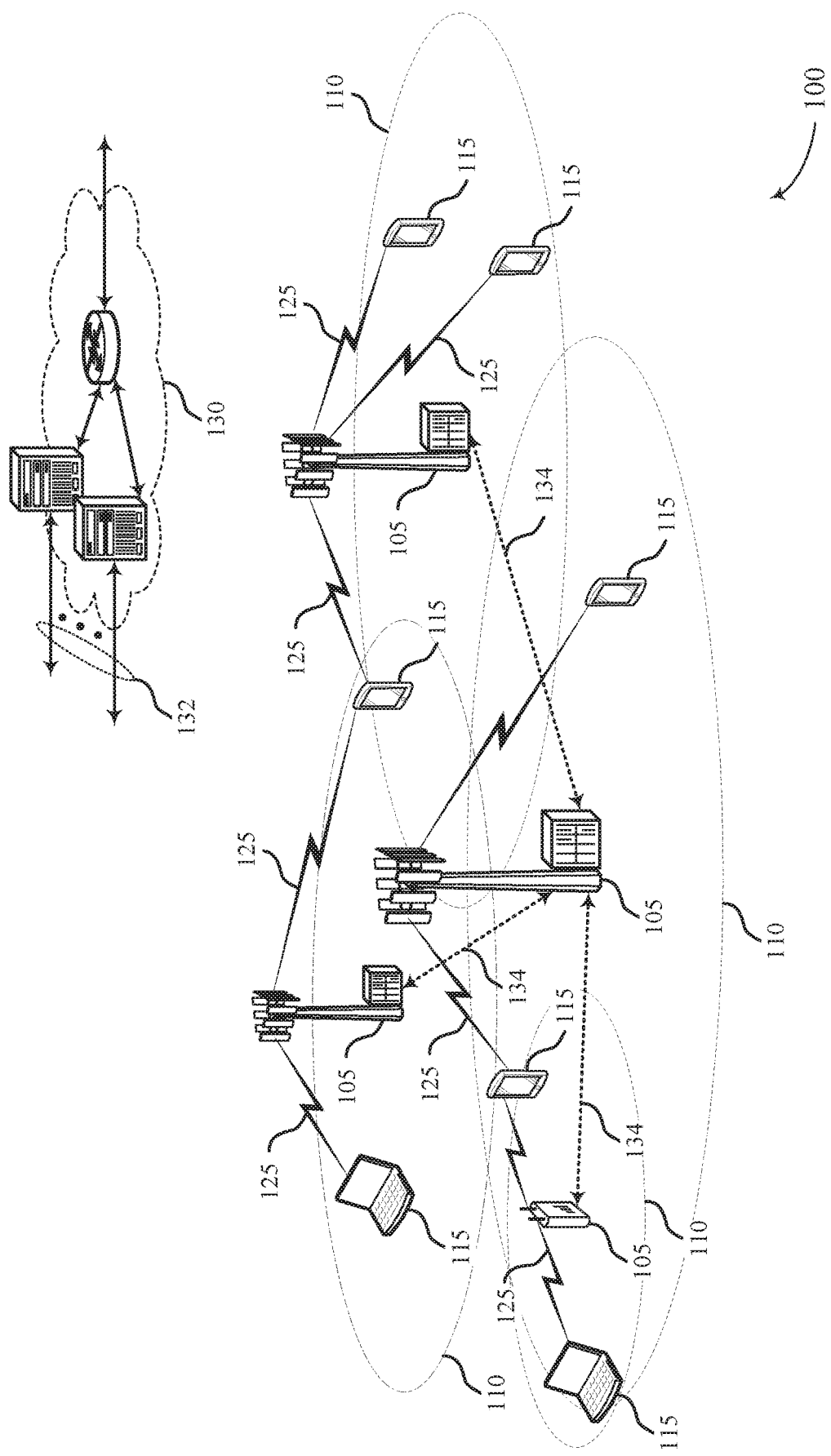
FIG. 1 illustrates an example of a system for wireless communications that supports adaptive monitoring in accordance with aspects of the present disclosure.

The described devices and techniques provide for efficient modification of RS measurement configurations, which may be based on conditions of a UE (e.g., mobility, discontinuous reception mode (DRX), beam conditions, etc.). Adaptive monitoring for RS measurement configurations may be used to minimize scheduling restrictions within a network and may reduce unnecessary power consumption at the UE. The RS measurement configurations may be used for BM, RRM, RLM, and channel tracking.

Generally, a UE may communicate using beamforming techniques and may perform RS measurements on the beams used for communication, for example, to ensure adequate channel quality for future communications. As described herein, multiple measurement configurations may be provided from a base station to the UE. In some cases, each measurement configuration may include different sets of measurement parameters (e.g., measurement periodicity, measurement windows, and the like) used for measuring a RS of one or more beams in a cell. Accordingly, the UE configured with one or more measurement configurations may be able to activate, deactivate, and/or switch between different measurement configurations implicitly based on changes in UE condition or explicitly based on signaling from a base station. For example, the base station may transmit explicit signaling that instructs the UE to activate/deactivate a selected measurement configuration. In other examples, the base station may indicate that the UE is to switch between different measurement configurations to adapt to changes in, for example, the UE's mobility or channel quality experienced by the UE. In some cases, sub-sampling periods may be used for one or more measurement configurations, such as when additional measurements are needed, for example, when operating at high mobility and/or poor beam quality conditions. These sub-sampling periods may inform the network how a particular measurement configuration may be adjusted, and signaling from the base station may further instruct the UE how measurement parameters of the configuration are to be adjusted based on the sub-sampling results.

Changes (e.g., activating, deactivating, and/or switching) to previously used measurement configurations may be performed on a defined timeline to reduce delay, excessive signaling, unnecessary measurements, and the like. Further, the use of adaptive monitoring and/or multiple measurement configurations may reduce or eliminate scheduling restrictions (e.g., due to a conflict between when a UE is to perform a measurement and when communications are scheduled, or due to which type of RS is to be monitored, etc.). Adaptive monitoring may thus be used by a network to dynamically increase or decrease measurement periodicities with regards to different conditions (e.g., beam quality and/or UE mobility). For example, in a system with high beam quality and/or low UE mobility, measurement frequency may be decreased, or inter-cell frequency measurements may be partially or completely deactivated. In some cases, the network also may use adaptive monitoring to modify a set of beams to monitor via switching to a different configuration. As a result, instead of using static or slowly changing measurement configurations, a base station and UE may dynamically adjust measurement configurations to perform as-needed measurements, thereby improving efficiency in the wireless communications system and conserving power at the UE.

Aspects of the disclosure are initially described in the context of a wireless communications system. Example operation timelines for a system using adaptive monitoring techniques are described herein. Aspects of the disclosure are further illustrated by and described with reference to apparatus diagrams, system diagrams, and flowcharts that relate to adaptive monitoring.

FIG. 1 illustrates an example of a wireless communications system 100 that supports adaptive monitoring in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support dynamic adaptation of measurement configurations at a UE 115 through explicit or implicit selection of different measurement configurations and/or measurement parameters.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCM)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication), M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMEO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

In some cases, a UE 115 may continuously monitor a communication link 125 for an indication that the UE 115 may receive data. In other cases (e.g., to conserve power and extend battery life) a UE 115 may be configured with a DRX cycle. A DRX cycle consists of an "On Duration" when the UE 115 may monitor for control information (e.g., on PDCCH) and a "DRX period" when the UE 115 may power down radio components. DRX cycles (e.g., for connected-mode DRX) may be used to enable the efficient use of battery power for reception of downlink transmissions. In some cases, a base station 105 and a UE 115 may establish an RRC connection and the UE 115 may enter a sleep state when not actively communicating. For example, during RRC connection establishment, a DRX configuration, including a DRX-On cycle and DRX-Off cycle duration, may be configured in an RRC connection setup request or an RRC connection reconfiguration request. The DRX configuration may determine how frequently the UE 115 is scheduled to wake up and receive downlink data in accordance with the configured DRX cycle durations. The UE 115 may wake up during a DRX-On duration, and monitor one or more physical downlink control channel (PDCCH) subframes for downlink control information (DCI) designated for the UE 115, including a radio network temporary identifier (RNTI) (e.g., a cell-specific RNTI (C-RNTI), and subsequent physical downlink shared channel (PDSCH) transmissions.

In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer." When the DRX Short Cycle Timer expires, the UE 115 may resume a long DRX cycle.

DRX cycles (e.g., when operating in a DRX mode) may be used to enable the efficient use of battery power for reception of downlink transmissions. A base station 105 and a UE 115 may establish an RRC connection and the UE 115 may enter a sleep state when not actively communicating. For example, during RRC connection establishment, a DRX configuration, including a DRX-On cycle and DRX-Off cycle duration, may be configured in an RRC connection setup request or an RRC connection reconfiguration request. The DRX configuration may determine how frequently the UE 115 is scheduled to wake up and receive downlink data in accordance with the configured DRX cycle durations. The UE 115 may wake up during a DRX-On duration, and monitor one or more physical downlink control channel (PDCCH) subframes for downlink control information (DCI) designated for the UE 115, including a radio network temporary identifier (RNTI) (e.g., a cell-specific RNTI (C-RNTI), and subsequent physical downlink shared channel (PDSCH) transmissions.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that may not be capable of monitoring the whole carrier bandwidth or may be otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.)

at reduced symbol durations e.g., 16.67 microseconds (μs)). A TTI in eCC may consist of one or multiple symbol periods. In some cases, the TTI duration (that is, the number of symbol periods in a TTI) may be variable.

Wireless communications systems, such as NR systems, may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support the use of adaptive monitoring configurations used for RS measurements within the system. For example, a UE 115 may utilize efficient modifications to RS measurement configurations, which may be based on the condition of the UE 115 (e.g., mobility, DRX, channel conditions experiences, etc.). The RS measurements may be used for intra-cell (e.g., within coverage area 110 of base station 105) or inter-cell (e.g., between different coverage areas 110 of base stations 105) channel quality measurements. For example, the RS measurements may be used for BM, RRM, RLM, channel tracking, and the like. A plurality of measurement configurations may be provided for a UE 115. In some cases, each measurement configuration of the plurality may include different sets of measurement parameters (e.g., measurement periodicity and windows) used for measuring a RS of a cell. The UE 115 may be configured with one or more measurement configurations and may be able to activate, deactivate, and/or switch between different measurement configurations (or parameters of a measurement configuration) implicitly based on changes in conditions experienced by the UE 115 or explicitly based on signaling from a base station 105.

Changes to previously used measurement configurations may be done on a clear, well-defined timeline to reduce delay, excessive signaling, unnecessary measurements, and the like. In some cases, one or more of the base stations 105 may include a base station measurement configuration manager, which may determine different measurement configurations that may be used by UE 115. The base station 105 may then select one of the measurement configurations, for example, based on beam and UE 115 conditions. Base station 105 may then communicate which of the measurement configurations the UE 115 should operate on. In some cases, base station 105 may signal to the UE 115 to activate, deactivate, and/or switch to a measurement configuration.

UEs 115 may include a UE measurement configuration manager, which may receive signaling related to different measurement configurations for the UE 115. UE 115 may then determine a specific measurement configuration with determined parameters and a reporting scheme based on the received signaling from the base station 105. In some cases, UE 115 may not receive an explicit signal that indicates which measurement configuration to use. In these cases, UE 115 may change an operating mode, which may trigger a change of one or more measurement configurations (or a change of parameters for a measurement configuration). For example, a change from DRX operation to active operation may trigger a change in measurement configurations (e.g., measurement frequency and occasion timeline). In some cases, UE 115 may take measurements at additional times (e.g., sub-sampling periods) based on receiving an indication from base station 105.

Figure 2:
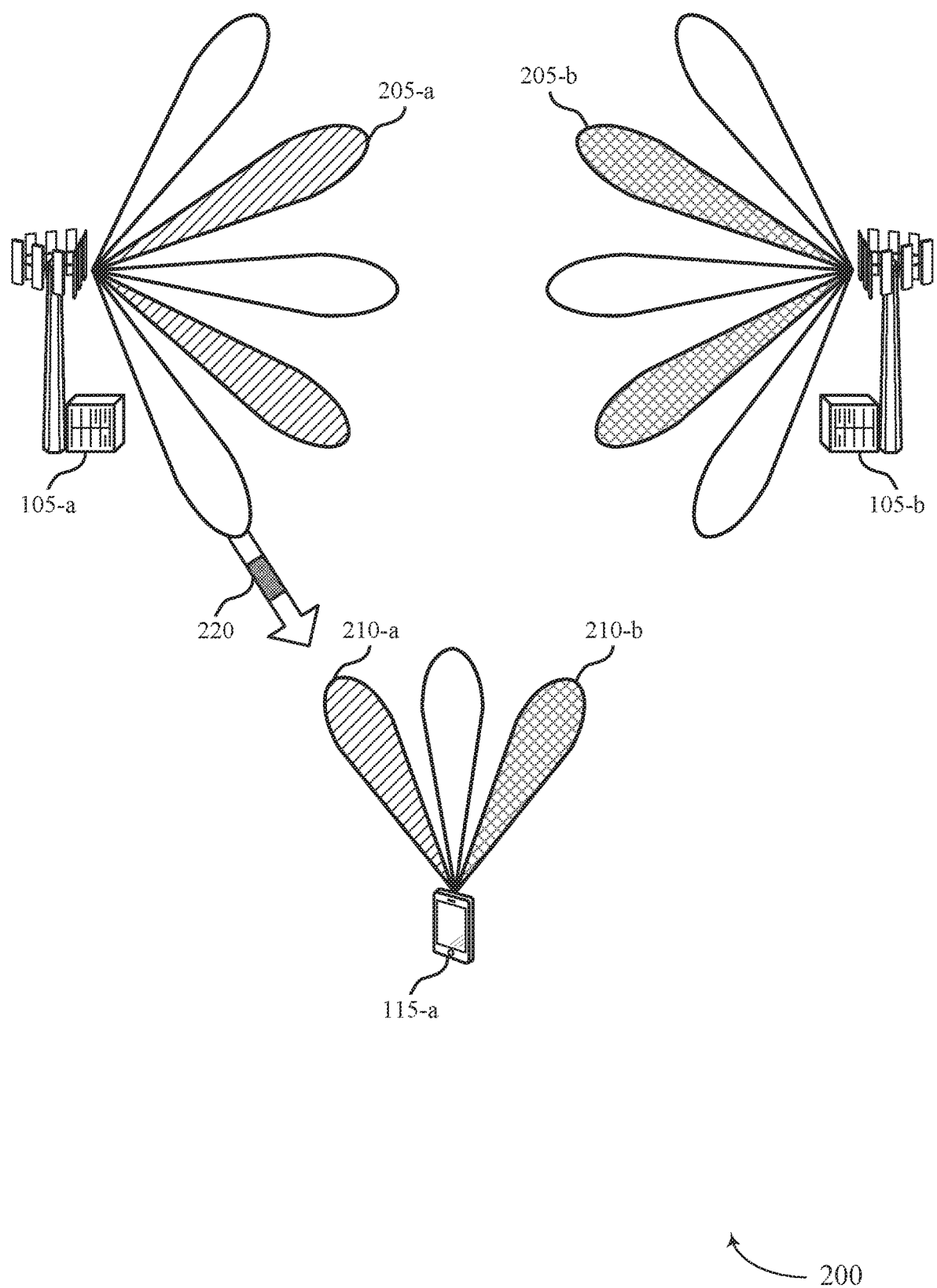
FIG. 2 illustrates an example of a system for wireless communications that supports adaptive monitoring in accordance with aspects of the present disclosure.

FIG. 2 illustrates an example of a system for wireless communications 200 that supports adaptive monitoring in accordance with aspects of the present disclosure. In some examples, wireless communications system 200 may implement aspects of wireless communications system 100. Wireless communications system 200 may include UE 115-a and base stations 105-a and 105-b, which may be examples of the corresponding device described herein.

UE 115-a may be in communication with base station 105-a using beams 205-a and 210-a. UE 115-a may perform RS measurements on beams 205-a of base station 105-a and/or beams 205-b of base station 105-b. The mobility considerations of UE 115-a in systems using beamforming, such as wireless communications system 200, may include intra-cell mobility and inter-cell mobility. In some examples, intra-cell mobility may refer to a UE's 115-a ability to move within a single cell (e.g., cell of base station 105-a) and may use BM to monitor channel conditions and ensure successful reception of a beam 205-a from the base station 105-a of the cell at UE 115-a. In some cases, BM may occur using layer 1 (L1) and/or layer 2 (L2) signaling. In some examples, inter-cell mobility may refer to an ability of UE 115-a to move between cells (e.g., cell of base station 105-a and cell of base station 105-b) and may use RRM to monitor channel conditions and allow for a successful transition between cells. Radio resource management may use layer 3 (L3) signaling. However, there may not be a dedicated mobility signal in L1, L2, or L3 signaling.

The key functionalities related to multi-beam mobility may relate to feedback reporting within wireless communications system 200. In particular, cell-specific reference signal (CRS) functionality may be included in a synchronization signal block (SSB) (e.g., including one or more synchronization signals and/or a broadcast channel) and/or a channel state information (CSI) reference signal (CSI-RS). For example, different RS measurement techniques such as RRM, BM, RLM, and channel tracking may be based on one or both of the SSB and CSI-RS. In some cases, the CSI-RS may include a tracking (or tertiary) reference signal (IRS) used, for example, for position tracking of UEs 115. RRM may be done for the serving cell (e.g., associated with base station 105-a) of UE 115-a and/or the neighbor cells (e.g., associated with base station 105-b) of the UE 115. Additionally, BM, RLM, and channel tracking may be performed for the serving cell of UE 115-a. In NR systems, such as wireless communications system 200, RRM, BM, RLM, and channel tracking may be complex due to beamforming and variable sub carrier spacing.

RRM may be used for a variety of resource measurements that are based on multiple beams and may be triggered to report such measurements based on various factors. For example, RRM may include measurement results per SSB and/or physical broadcast channel (PBCH) block. In another example, RRM may include measurement results per cell based on SSB(s) and/or PBCH block(s). When results are per cell, the cell measurements may be configured to return the highest measured beam among the SSB beams or may be configured as the linear average of some of the highest configured SSB beams. In some examples, RRM may include measurement results per CSI-RS resource. In some examples, RRM may include measurement results per cell based on the CSI-RS resource(s). When results are per cell based on the CSI-RS, the cell measurements may be configured to return the highest measured beam among the CSI-RS beams or may be configured as the linear average of some of the highest configured CSI-RS beams.

RRM measurement report triggering may occur with a number of events. For example, the RRM measurement report may be triggered when the serving cell measurement exceeds (e.g., becomes better than) a threshold. In another example, the RRM measurement report may be triggered when the serving cell measurement falls below a threshold. In another example, the RRM measurement report may be triggered when a neighboring cell becomes better than a special cell (SpCell) by an offset. In another example, the RRM measurement report may be triggered when a neighboring cell exceeds (e.g., becomes better than) a threshold. In another example, the RRM measurement report may be triggered when an SpCell falls below (e.g., becomes worse than) a first threshold and a neighboring cell exceeds (e.g., becomes better than) a second threshold. In another example, the RRM measurement report may be triggered when a neighboring cell becomes better than a secondary cell (SCell) by an offset.

UE 115-$a$ may be capable of receiving communications using beamforming techniques. In some cases, UE 115-$a$ may perform reference signal measurements of base station 105-$a$ and/or base station 105-$b$. UE 115-$a$ may be configured to perform RRM, BM, and/or RLM at different times. For example, RRM (e.g., SSB-based and CSI-based) may be performed by UE 115-$a$ for intra-cell and inter-cell measurements without a measurement gap (MG). In some cases, the RRM may be performed in the configured SSB measurement timing configuration (SMTC) window when no MG is used. In other examples, RRM (e.g., SSB-based and CSI-based) may be performed for intra-cell and inter-cell measurements with a MG. In these cases, the RRM may be performed in the configured MG, which may overlap in time and/or frequency with the SMTC window when a MG is used. BM and/or RLM may be performed by UE 115-$a$ for the configured reference signal (e.g., SSB and/or CSI-RS). In some cases, there is not a specific instance defined for when to perform the BM and RLM measurements. UE 115-$a$ may perform BM measurements at a certain number of intervals (e.g., the shortest periodicity of a configured RS, 2 ins). Additionally or alternatively, UE 115-$a$ may perform RLM measurements when in a normal (e.g., non-discontinuous reception (non-DRX)) mode with a certain periodicity (e.g., the shortest periodicity of a configured RS, 10 ms). UE 115-$a$ may also perform RLM measurements, e.g., when in a DRX mode with a certain periodicity (e.g., the shortest periodicity of a configured RS and DRX periodicity). The network may configure the UE 115-$a$ to perform measurements for either SSB or CSI-RS. However, in some cases, there may not be an obligation for UE 115-$a$ to perform measurements. That is, the timeframe in which UE 115-$a$ performs measurements may be ambiguous or not defined.

The varying number of measurements and configurations for RRM, BM, and RLM on multiple beams (e.g., all beams) may have an impact on UE 115-$a$ performance. For example, the network may encounter scheduling restrictions for transmissions to LT 115-$a$ due to the high resource demand of RRM, BM, and RLM. The scheduling restriction may be due to the use of different receive beams associated with RRM, BM, and RLM. The use of different sub carrier spacing of reference signals (e.g., SSB and CSI-RS) may be another example source of scheduling restriction. Scheduling restriction may also occur due to the use of a measurement gap for intra-call and inter-cell frequency measurements, for example, the network may not schedule a transmission for UE 115-$a$ when there is a measurement gap present. In some cases, another impact of RRM, BM, and RLM may include unnecessary power consumption at UE 115-$a$ when performing measurements more frequently than needed. In some cases, UE 115-$a$ may require more frequent RRM, BM, and RLM when in a high mobility state and may require less frequent RRM, BM, and RLM than when UE 115-$a$ is in a more stationary state.

In some cases, the process used to change individual measurement configurations (e.g., for RRM, BM, and RLM) may be done via RRC signaling. However, changes through RRC may be semi-static and may not change configurations in an efficient amount of time (e.g., to account for rapidly changing conditions at UE 115-$a$). Further, the timeline for UE 115-$a$ to use an updated measurement configuration indicated by RRC signaling may not be clear or well defined. The timeline may be ambiguous regarding the exact time when UE 115-$a$ should begin using the updated measurement configuration.

For BM and RLM, a network may unnecessarily have to assume that all beams are needed for measurements when UE 115-$a$ performed measurements are not clearly defined. Adaptive monitoring for RLM, BM, and RRM may be used to minimize scheduling restrictions for the network as well as unnecessary power consumption at UE 115-$a$. UE 115-$a$ may adjust the parameters used for RS measurements as the condition of UE 115-$a$ changes, for example, UE 115-$a$ velocity increases. This change may be a result of signaling from a serving base station (e.g., base station 105-$a$) or may be triggered by the change in operating state at UE 115-$a$.

As described in further detail below, adaptive monitoring may be implemented in wireless communications system 200 to alleviate the challenges associated with varying types of measurements for different beams and changing mobility conditions of UE 115-$a$. For example, base station 105-$a$ may provide multiple measurement configurations 220 to UE 115-$a$. The multiple measurement configurations may be sent via RRC signaling (e.g., within a single information element of an RRC message). Base station 105-$a$ may also send additional signaling (e.g., via DCI or a MAC-CE) that activates, deactivates, and/or switches to one of the multiple measurement configurations. Additionally or alternatively, base station 105-$a$ may perform sub-sampling of measurement occasions associated with a measurement configuration and indicate adjustments to the measurement parameters (e.g., periodicity, occasions, offsets, etc.) of the measurement configuration. In other examples, UE 115-$a$ may determine adjustments in a measurement configuration based on, for example, UE 115-$a$ being in a DRX mode.

Figure 3:
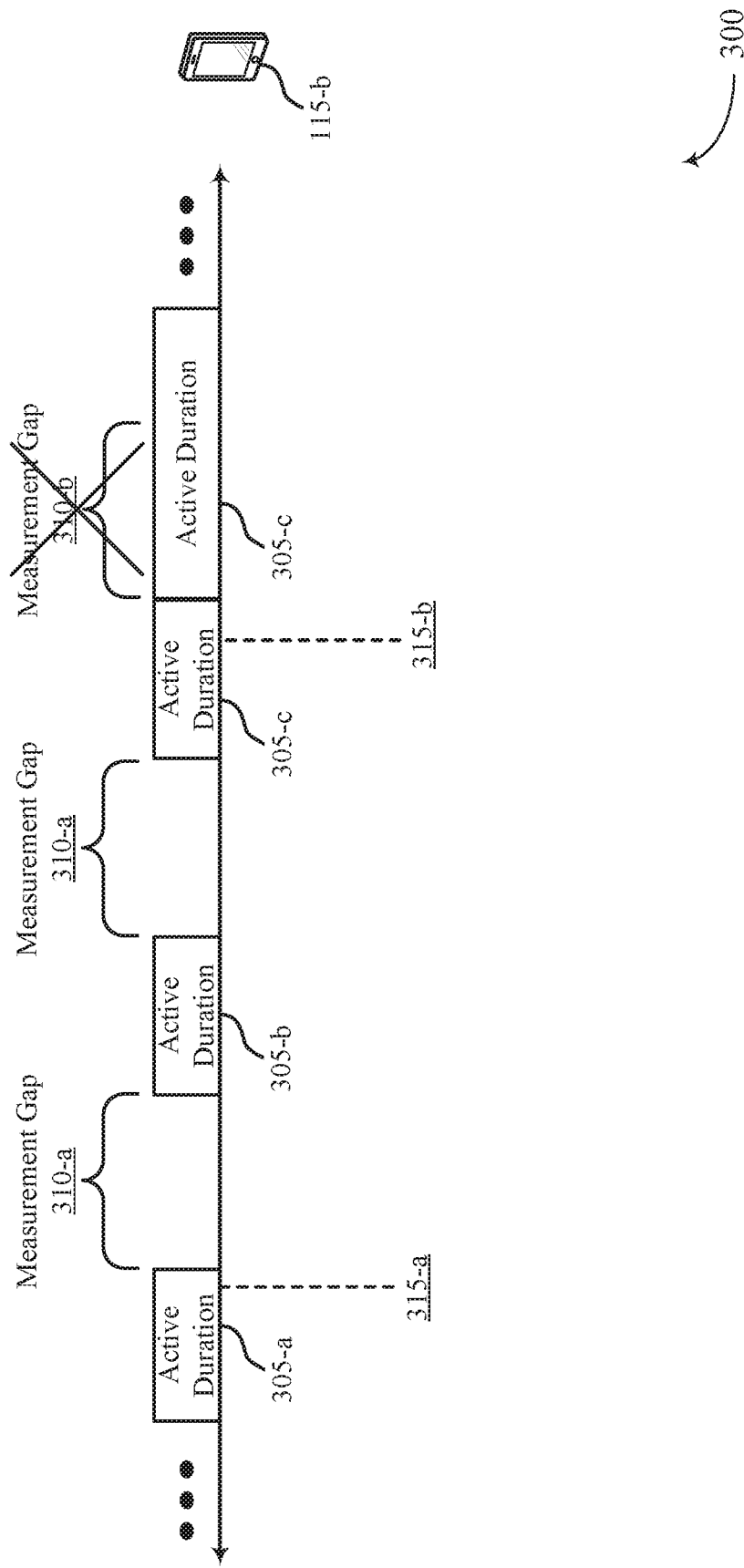
FIG. 3 illustrates an example of a timeline that supports adaptive monitoring in accordance with aspects of the present disclosure.

FIG. 3 illustrates an example of a timeline 300 that supports adaptive monitoring in accordance with aspects of the present disclosure. In some examples, timeline 300 may implement aspects of wireless communications system 100. Timeline 300 may include UE 115-$b$, which may be an example of the corresponding device described herein. UE 115-$b$ may be configured to perform RS measurements such as, BM, RLM, and RRM on a cell.

In some cases, UE 115-$b$ may be operating in a normal (e.g., RRC_Connected) mode. This mode may include active durations 305 when UE 115-$b$ may transmit and receive communications (e.g., data). This mode may also include configured measurement parameters. For example, UE 115-$b$ may perform RS measurements based on a schedule (e.g., a specific periodicity of MGs 310). In some cases, UE 115-$b$ may use adaptive monitoring when operating in an RRC_Connected mode. Adaptive monitoring may include the use of multiple measurement configurations. For example, multiple measurement configurations may exist for each of BM, RLM, and RRM. These multiple measurement configurations may be signaled to UE 115-$b$ via a single RRC transmission and may also include multiple SMTC configurations to be used by UE 115-*b* for RRM measurements with no required MG.

In other examples, multiple MG configurations may be included, and the MG configurations may be used by UE 115-*b* for RRM measurements with a MG 310. In some examples, multiple measurement configurations for BM and RLM may be included; these may be linked to the RS configuration (e.g., SSB or CSI-RS) or may be independent of the RS configuration. In some examples, different configurations may include different periodicities for SMTC and MG 310, and different time-domain windows for SMTC and MG 310. For example, both an offset and a periodicity for an SMTC window may be indicated to determine specific monitoring/measurement instances. In other cases, there may be no explicit measurement window with certain RS configurations, and default measurement configurations may be configured or indicated by the network.

Adaptive monitoring may provide the ability to activate, deactivate, and/or switch to one of the configurations via control signaling. For example, the control signaling may include a MAC-CE or DCI. The timeline of MAC-CE and DCI signaling may be more clearly defined than RRC and may be more frequent than RRC (e.g., 10 ms RRC delay in comparison to a 2 ms delay). This may allow UE 115-*b* to avoid the ambiguous timelines related to RRC reconfiguration, and UE 115-*b* may undergo faster switching compared to RRC reconfiguration. In some cases. UE 115-*b* may also receive control signaling from another carrier indicating a change to a measurement configuration.

For example, UE 115-*b* may be operating in an active duration 305-*a* and receive control signaling (e.g., via MAC-CE or DCI) from a base station at 315-*a*. The control signaling may switch UE 115-*b* to a different measurement configuration, which may be predefined, that includes MGs 310. The measurement configuration may include the timing and frequency of MGs 310 will and when UE 115-*b* should take the RS measurements within the MGs 310. UE 115-*b* may follow this first measurement configuration in multiple MGs 310-*a* and active durations 305-*b* and 305-*c*. In active durations 305, UE 115-*b* may not be performing RS measurements.

UE 115-*b* operating in an active duration 305-*c* may be configured with the first measurement configuration received at 315-*a*. UE 115-*b* may receive additional control signaling at 315-*b*. The additional control signaling may be included in a MAC-CE or DCI. Additionally or alternatively, the control signaling may be received on a different carrier or bandwidth part (BWP). In some examples, UE 115-*b* may transmit an acknowledgement (ACK) to the base station in response to the additional control signaling at 315-*b*. In some cases, the change to the measurement configuration at the base station and/or UE 115-*b* may be based on the ACK transmitted by UE 115-*b*, and an application of updated measurement configurations may be with respect to either the additional control signaling or the ACK.

The control signaling at 315-*b* may instruct UE 115-*b* to deactivate the current measurement configuration. Accordingly, UE 115-*b* may not perform RS measurements in MG 310-*b* and instead may operate in an active duration 305-*c* until, for example, further control signaling is received.

Figure 4:
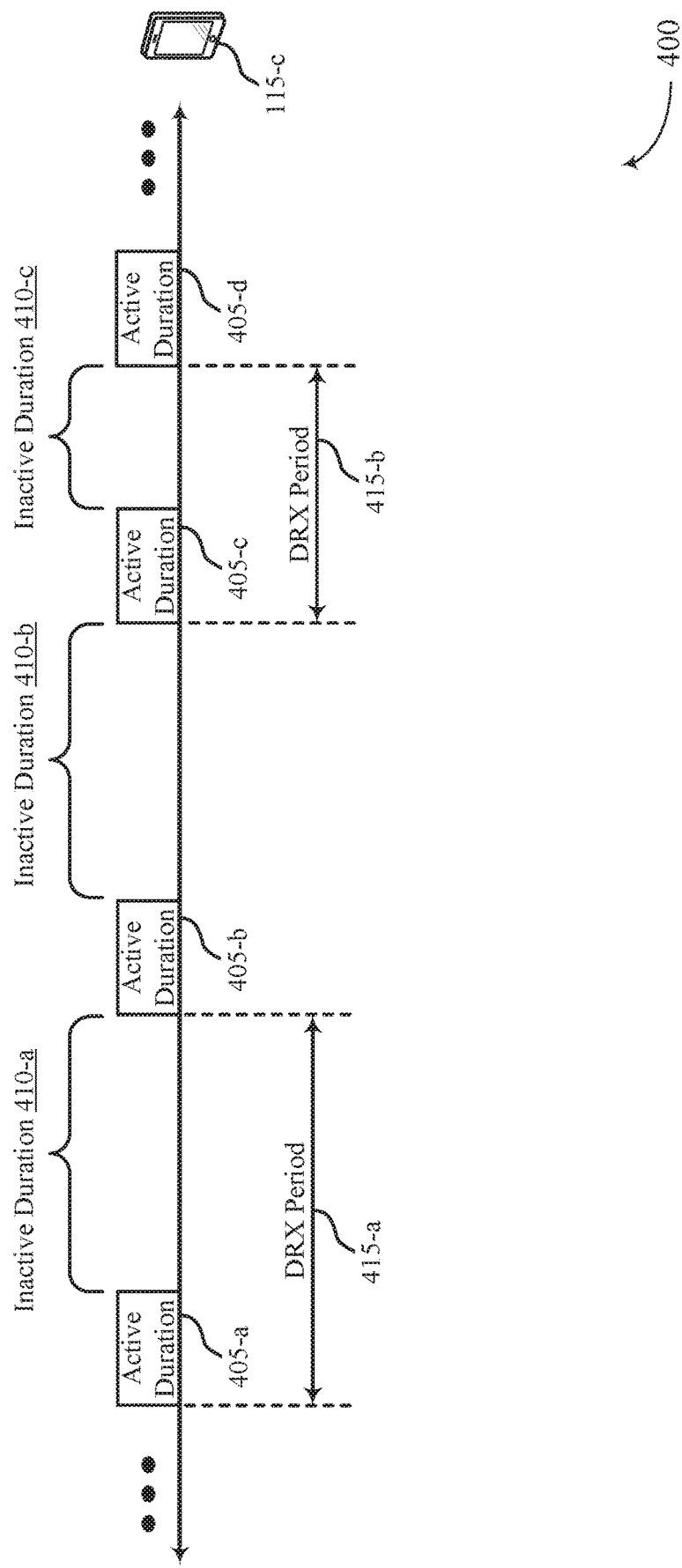
FIG. 4 illustrates an example of a timeline that supports adaptive monitoring in accordance with aspects of the present disclosure.

In some examples, adaptive monitoring may include an alternative or additional option to configuring multiple measurement configurations. For example, the use of sub-sampling of measurement occasions may be introduced. The sub-sampling may include defined rules from an RS configuration. Another alternative or additional technique may include the use of explicit MAC-CE or DCI commands to activate, deactivate, or switch to a different measurement periodicity or occasion. The ability to use different RS measurement periodicities and adaptable measurement windows may allow UE 115-*b* and network to more efficiently perform BM, RLM, RRM, and data transfer, FIG. 4 illustrates an example of a timeline 400 that supports adaptive monitoring in accordance with aspects of the present disclosure. In some examples, timeline 400 may implement aspects of wireless communications system 100. Timeline 400 may include TIE 115-*c*, which may be an example of the corresponding device described herein. UE 115-*c* may be configured to perform RS measurements such as, BM, RLM, and RRM on a cell. Timeline 400 may illustrate the implicit adaptation of measurement configurations by UE 115-*c*, for example, based on a DRX cycle.

In some examples, UE 115-*c* may be operating in a connected discontinuous reception (CDRX) mode, where the UE 115-*c* may be in an RRC_Connected mode and reception sleep cycles. UE 115-*c* may use implicit adaptive monitoring when operating in CDRX mode. For example, since measurement adaptation is related to the CDRX state of UE 115-*c*, when the UE 115-*c* enters CDRX operation, the UE 115-*c* may switch to a larger measurement periodicity. In another example, when the UE 115-*c* exits CDRX operation, UE 115-*c* may switch to a smaller measurement periodicity to conserve power.

As illustrated, UE 115-*c* may be operating in a CDRX mode with a DRX period 415-*a* that includes active duration 405-*a* and inactive duration 410-*a*. During active duration 405-*a*, UE 115-*c* may enable reception components and take RS measurements of the serving and/or neighboring cells. UE 115-*c* may be configured with a first measurement configuration that defines RS measurement parameters for both the active duration 405-*a* and inactive duration 410-*a* of the DRX period 415-*a*. These parameters may include the measurement periodicity and may be related to the DRX period 415-*a* and the active duration 405-*a*. In some cases, RS measurements may be configured and/or performed during inactive duration 410-*a*, as it may not always be possible to align RS occasions and active duration 405-*a*.

After inactive duration 410-*b*, UE 115-*c* may operate according to a different DRX period 415-*b* including active duration 405-*c* and inactive duration 410-*c*. DRX period 415-*b* may be shorter than DRX period 415-*a*, and thus the measurement configuration of UE 115-*c* may be adapted. UE 115-*c* may detect this change in DRX operation as a trigger to update measurement parameters. UE 115-*c* may be configured with a second measurement configuration that defines RS measurement parameters for both the active duration 405-*c* and inactive duration 410-*c* of the DRX period 415-*b*. These parameters may include the measurement periodicity and may be related to the DRX period 415-*b* and the active duration 405-*c*. For example, UE 115-*c* may update to the second measurement configurations, which may increase the periodicity of RS measurements with the shorter DRX period 415-*b* in comparison to the first measurement configuration. In some cases, the adaptation of the RS measurement configuration may be independent of changes in CDRX parameters (e.g., changes in DRX periods 415).

A measurement periodicity may be associated with the DRX period 415. For example, a larger measurement periodicity may be used with a longer DRX period (e.g., 415-*a*). In some cases, measurement occasions may be defined based on the DRX active occasion (e.g., 405). UE 115-*c* may not receive explicit signal to adapt its measurement periodicity, but instead UE 115-*c* may implicitly know to change its measurement periodicity based on the switch to or from CDRX mode or to a different DRX period 415 duration.

Figure 5:
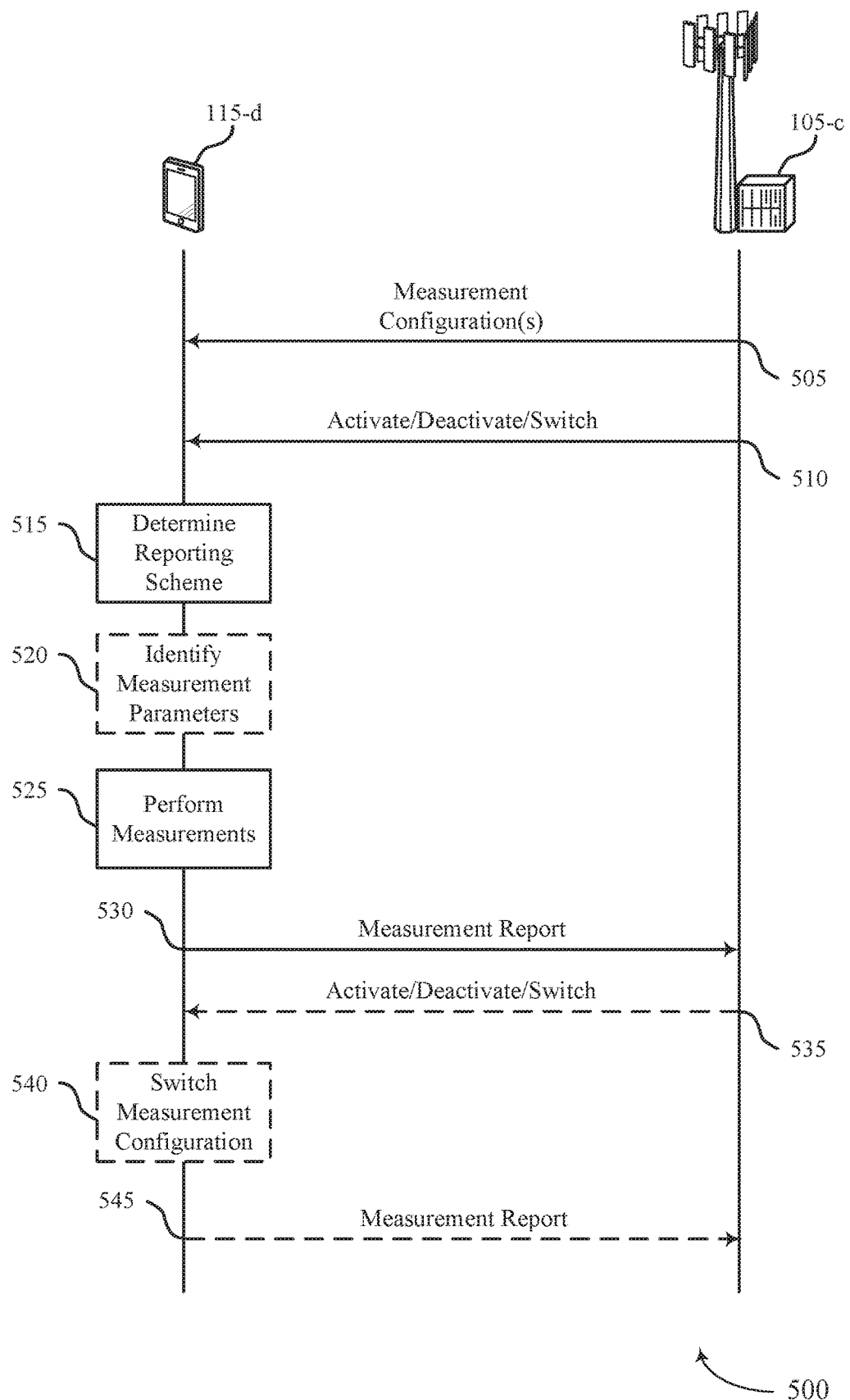
FIGS. 5 and 6 illustrate examples of process flows in a system that supports adaptive monitoring in accordance with aspects of the present disclosure.

FIG. 5 illustrates an example of a process flow 500 in a system that supports adaptive monitoring in accordance with various aspects of the present disclosure. In some examples, process flow 500 may implement aspects of wireless communications system 100. For example, process flow 500 includes a UE 115-d and base station 105-c, which may be examples of the corresponding devices described with reference to FIGS. 1 and 2. Process flow 500 may illustrate a system that supports dynamic selection of measurement configurations for a UE 115.

At 505, UE 115-d may receive, and base station 105-c may transmit, a first message indicating one or more measurement configurations. Each measurement configuration may include different sets of measurement parameters used for measuring a RS of a cell. In some cases, the RS may be from a cell provided by base station 105-c or from a neighboring cell. In some cases, the RS may be a synchronization signal (SS) block (or SS burst), a CSI-RS, or any combination thereof. Additionally, the first message may be transmitted via RRC signaling (e.g., an RRC information element may include an indication of multiple measurement configurations).

At 510, UE 115-d may receive (from base station 105-c), a second message indicating that UE 115-d activate a first measurement configuration, deactivate the first measurement configuration, or switch to the first measurement configuration, where the first measurement configuration is from the one or more measurement configurations. In some cases, the second message may be received via DCI, or via a MAC-CE, or via a different carrier, or via a different BWP (e.g., a BWP than a BWP that the RS is received on), or a combination thereof. At 515. UE 115-d may determine a measurement reporting scheme based at least in part on the indication to activate, deactivate, or switch to the first measurement configuration.

For example, at 515, UE 115-d may determine a set of measurement parameters of the first measurement configuration based on the second message indicating that UE 115-d activate the first measurement configuration. In such cases, UE 115-d may identify that the set of measurement parameters includes an SMTC window configuration selected from a multiple SMTC window configurations. In some cases, the SMTC window configuration includes a SMTC window periodicity, or a SMTC window size, or a SMTC window offset, or a combination thereof. Additionally or alternatively, UE 115-d may identify that the set of measurement parameters includes a measurement gap configuration selected from a set of measurement gap configurations, where the measurement gap configuration may include a measurement gap periodicity, or a measurement gap size, or a combination thereof.

In some cases, UE 115-d may identify that the set of measurement parameters includes an RS measurement configuration for performing measurements of the RS of the cell, the RS measurement configuration including a measurement periodicity, or a measurement window size, or a combination thereof. In some examples, the RS measurement configuration may correspond to a configuration of the RS of the cell or is independent of the configuration of the RS of the cell. Additionally or alternatively, the RS measurement configuration may indicate different types of RSs to be measured. In some cases, UE 115-d may identify that the set of measurement parameters includes a set of beams used for monitoring the RS, or an activation of inter-frequency measurements, or a deactivation of inter-frequency measurements, or a combination thereof.

In any case, at 525 UE 115-d may, after determining the measurement reporting scheme, perform measurements of the RS in accordance with the determined set of measurement parameters, and subsequently transmit a measurement report to base station 105-c at 530. In such cases, the measurement report may include measurements of the RS based on the measurement reporting scheme.

Additionally or alternatively, a message received by UE. 115-d at 535 (or the second message received at 510) may include an indication to deactivate the first measurement configuration. In some cases, the indication may provide a timeframe for deactivating the measurement configuration. Accordingly, after receiving the indication to deactivate the first measurement configuration, UE 115-d may stop measurements of the RS using the first measurement configuration based on the message indicating that UE 115-d deactivate the first measurement configuration.

In some cases, UE 115-d may perform measurements of the RS using a second measurement configuration, and may then, at 540, switch to the first measurement configuration based on, for example, the message received at 535 (or the second message received at 510) indicating that UE 115-d switch to the first measurement configuration. As such, UE 115-d may determine the set of measurement parameters of the first measurement configuration, where the set of measurement parameters of the first measurement configuration is different from a set of measurement parameters of the second measurement configuration, and UE 115-d may perform measurements of the RS in accordance with the determined set of measurement parameters. At 545, UE 115-d may transmitting a measurement report to base station 105-c comprising measurements of the RS based on the measurement reporting scheme.

Figure 6:
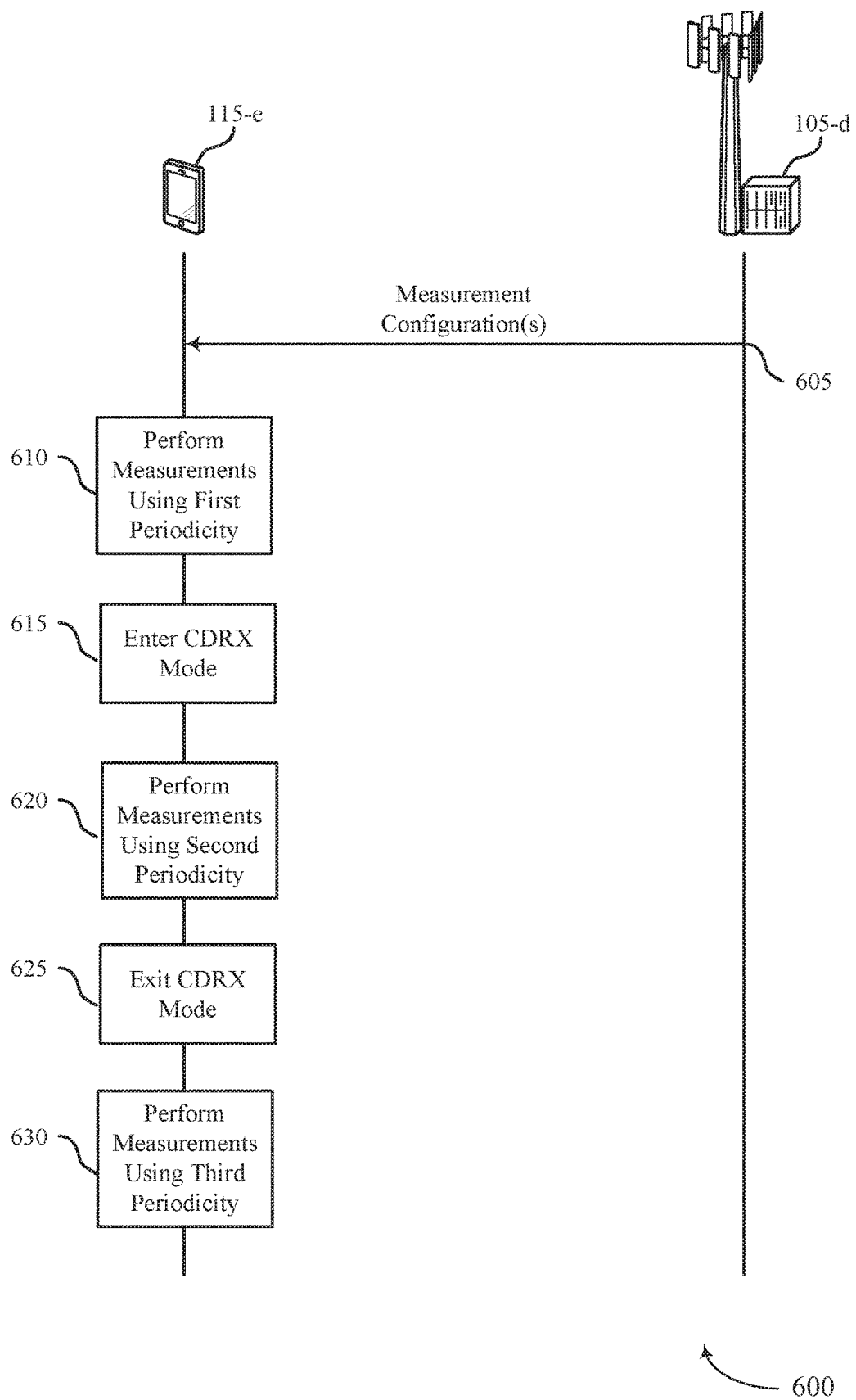

FIG. 6 illustrates an example of a process flow 600 in a system that supports adaptive monitoring in accordance with various aspects of the present disclosure. In some examples, process flow 600 may implement aspects of wireless communications system 100. For example, process flow 600 includes a UE 115-e and base station 105-d, which may be examples of the corresponding devices described with reference to FIGS. 1 and 2. Process flow 600 may illustrate a system that supports implicit adaptation of measurement configurations for a UE 115.

At 605, base station 105-d may transmit, and UE 115-e may receive, a message indicating one or more measurement configuration for measuring a RS of a cell. At 610, UE 115-e may perform measurements of the RS in accordance with a first periodicity of the measurement configuration.

At 615, UE 115-e may enter into a CDRX mode, and may subsequently, at 620, perform measurements of the RS of the cell in accordance with a second periodicity of the measurement configuration. The adjustment of the measurement configuration and periodicity may be based on the CDRX mode, where the first periodicity may be different from the second periodicity. For instance, the first periodicity may be shorter than the second periodicity, and measurement may thus be performed less frequently.

At 625, UE 115-e may exit the CDRX mode, and may proceed to perform measurements of the RS in accordance with a third periodicity, wherein the third periodicity may, for example, be shorter than the second periodicity. In other cases, based on conditions of UE 115-e, the third periodicity may be greater than the second periodicity. In any case, UE 115-e may adjust a measurement periodicity based on the CDRX mode, and in some cases may be defined by the CDRX mode.

Figure 7:
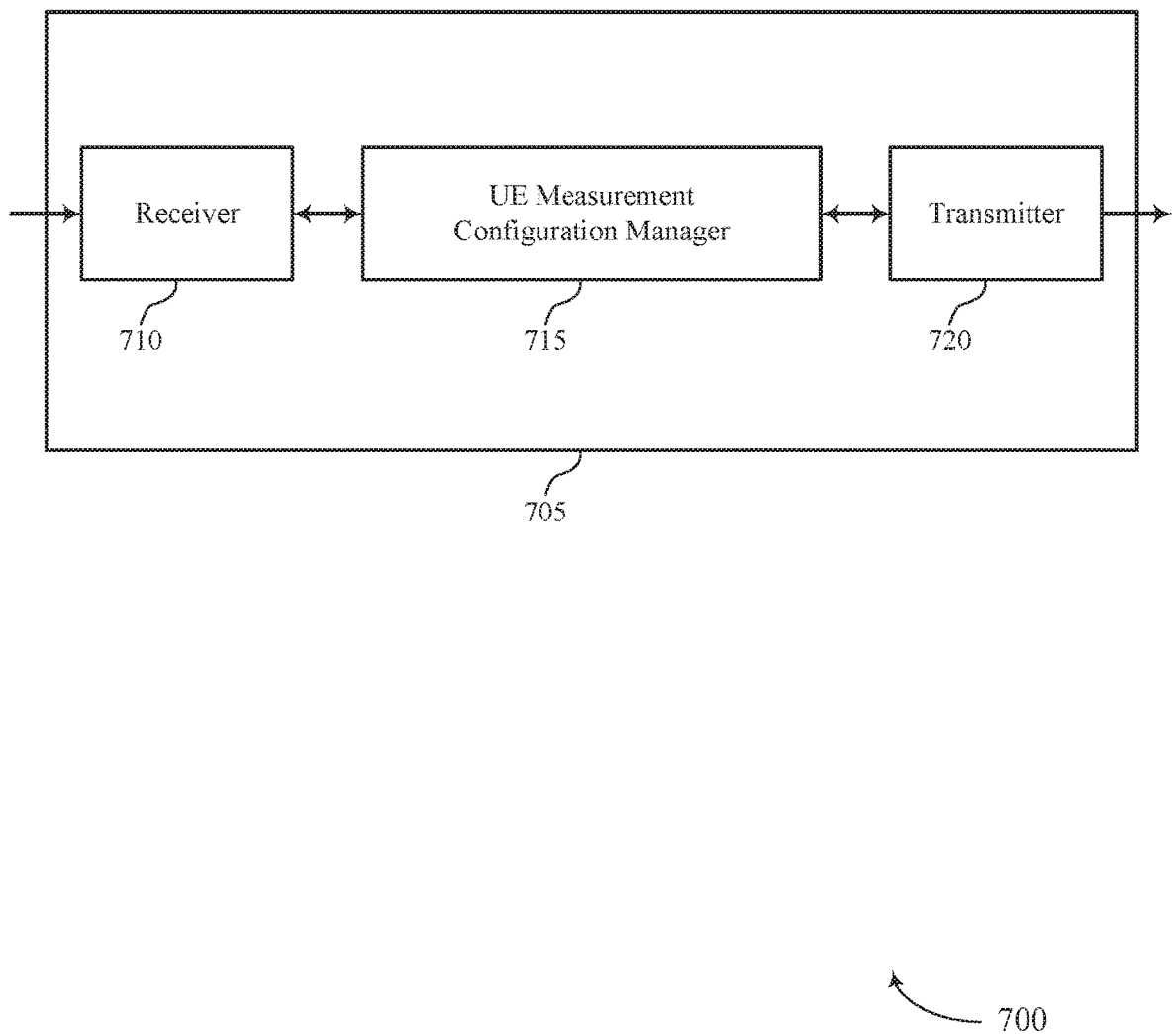
FIGS. 7 and 8 show block diagrams of devices that support adaptive monitoring in accordance with aspects of the present disclosure.

FIG. 7 shows a block diagram 700 of a device 705 that supports adaptive monitoring in accordance with aspects of the present disclosure. The device 705 may be an example of aspects of a UE 115 as described herein. The device 705 may include a receiver 710, a measurement configuration manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to adaptive monitoring, etc.). Information may be passed on to other components of the device 705. The receiver 710 may be an example of aspects of the transceiver 1020 described with reference to FIG. 10. The receiver 710 may utilize a single antenna or a set of antennas.

The measurement configuration manager 715 may receive, from a base station 105, a first message indicating a set of measurement configurations, each measurement configuration of the set of measurement configurations including different sets of measurement parameters used for measuring a RS of a cell, receive, from the base station 105, a second message indicating that the UE 115 activate a first measurement configuration, deactivate the first measurement configuration, or switch to the first measurement configuration, where the first measurement configuration is from the set of measurement configurations, and determine a measurement reporting scheme based on the indication to activate, deactivate, or switch to the first measurement configuration.

The measurement configuration manager 715 may also receive, from a base station 105, a first message indicating a measurement configuration for measuring a RS of a cell, receive, from the base station 105, a second message indicating that the UE 115 activate a first set of measurement parameters of the measurement configuration, deactivate the first set of measurement parameters, or switch to the first set of measurement parameters, and determine a measurement reporting scheme based on the indication to activate, deactivate, or switch to the first set of measurement parameters.

The measurement configuration manager 715 may also receive, from a base station 105, a message indicating a measurement configuration for measuring a RS of a cell, perform measurements of the RS in accordance with a first periodicity of the measurement configuration, perform measurements of the RS of the cell in accordance with a second periodicity of the measurement configuration and based on the DRX mode, the first periodicity being different from the second periodicity, and enter into a DRX mode. The measurement configuration manager 715 may be an example of aspects of the measurement configuration manager 1010 described herein.

The measurement configuration manager 715, or its sub-components, may be implemented in hardware, code (e.g., software or firmware) executed by a processor, or any combination thereof. If implemented in code executed by a processor, the functions of the measurement configuration manager 715, or its sub-components, may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The measurement configuration manager 715, or its sub-components, may be physically located at various positions, including being distributed such that portions of functions are implemented at different physical locations by one or more physical components. In some examples, the measurement configuration manager 715, or its sub-components, may be a separate and distinct component in accordance with various aspects of the present disclosure. In some examples, the measurement configuration manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
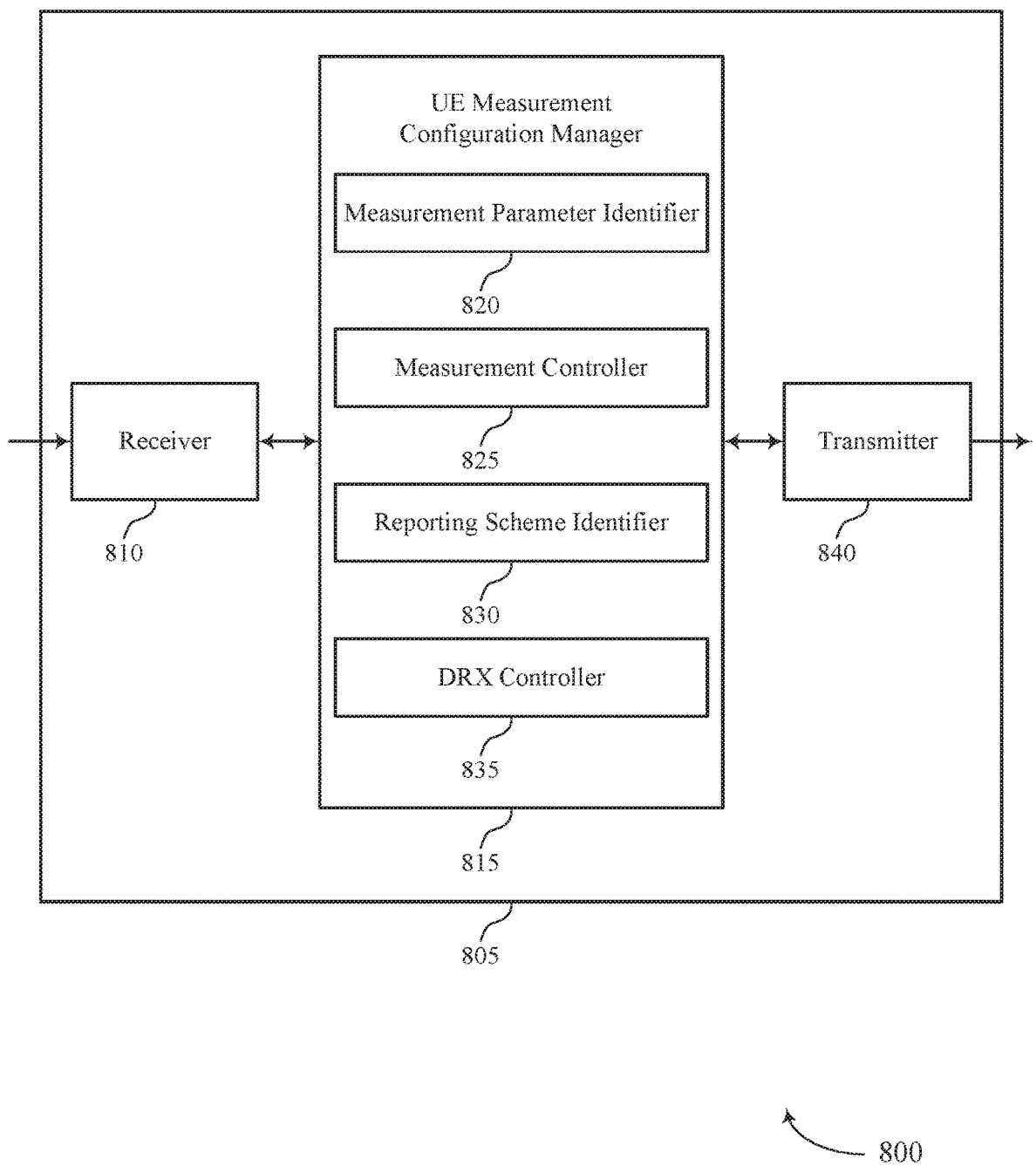

FIG. 8 shows a block diagram 800 of a device 805 that supports adaptive monitoring in accordance with aspects of the present disclosure. The device 805 may be an example of aspects of a device 705 or a UE 115 as described herein. The device 805 may include a receiver 810, a measurement configuration manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to adaptive monitoring, etc.). Information may be passed on to other components of the device 805. The receiver 810 may be an example of aspects of the transceiver 1020 described with reference to FIG. 10. The receiver 810 may utilize a single antenna or a set of antennas.

The measurement configuration manager 815 may be an example of aspects of the measurement configuration manager 715 as described herein. The measurement configuration manager 815 may include a measurement parameter identifier 820, a measurement controller 825, a reporting scheme identifier 830, and a DRX controller 835. The measurement configuration manager 815 may be an example of aspects of the measurement configuration manager 1010 described herein.

The measurement parameter identifier 820 may receive, from a base station, a first message indicating a set of measurement configurations, each measurement configuration of the set of measurement configurations including different sets of measurement parameters used for measuring a RS of a cell. The measurement parameter identifier 820 may receive, from a base station, a first message indicating a measurement configuration for measuring a RS of a cell.

The measurement controller 825 may receive, from the base station 105, a second message indicating that the UE 115 activate a first measurement configuration, deactivate the first measurement configuration, or switch to the first measurement configuration, where the first measurement configuration is from the set of measurement configurations.

The measurement controller 825 may receive, from the base station, a second message indicating that the UE 115 activate a first set of measurement parameters of the measurement configuration, deactivate the first set of measurement parameters, or switch to the first set of measurement parameters.

The measurement controller 825 may perform measurements of the RS in accordance with a first periodicity of the measurement configuration and perform measurements of the RS of the cell in accordance with a second periodicity of the measurement configuration and based on the DRX mode, the first periodicity being different from the second periodicity.

The reporting scheme identifier 830 may determine a measurement reporting scheme based on the indication to activate, deactivate, or switch to the first measurement configuration or the first set of measurement parameters. The DRX controller 835 may allow the UE 115 to enter into a DRX mode and exit a DRX mode.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
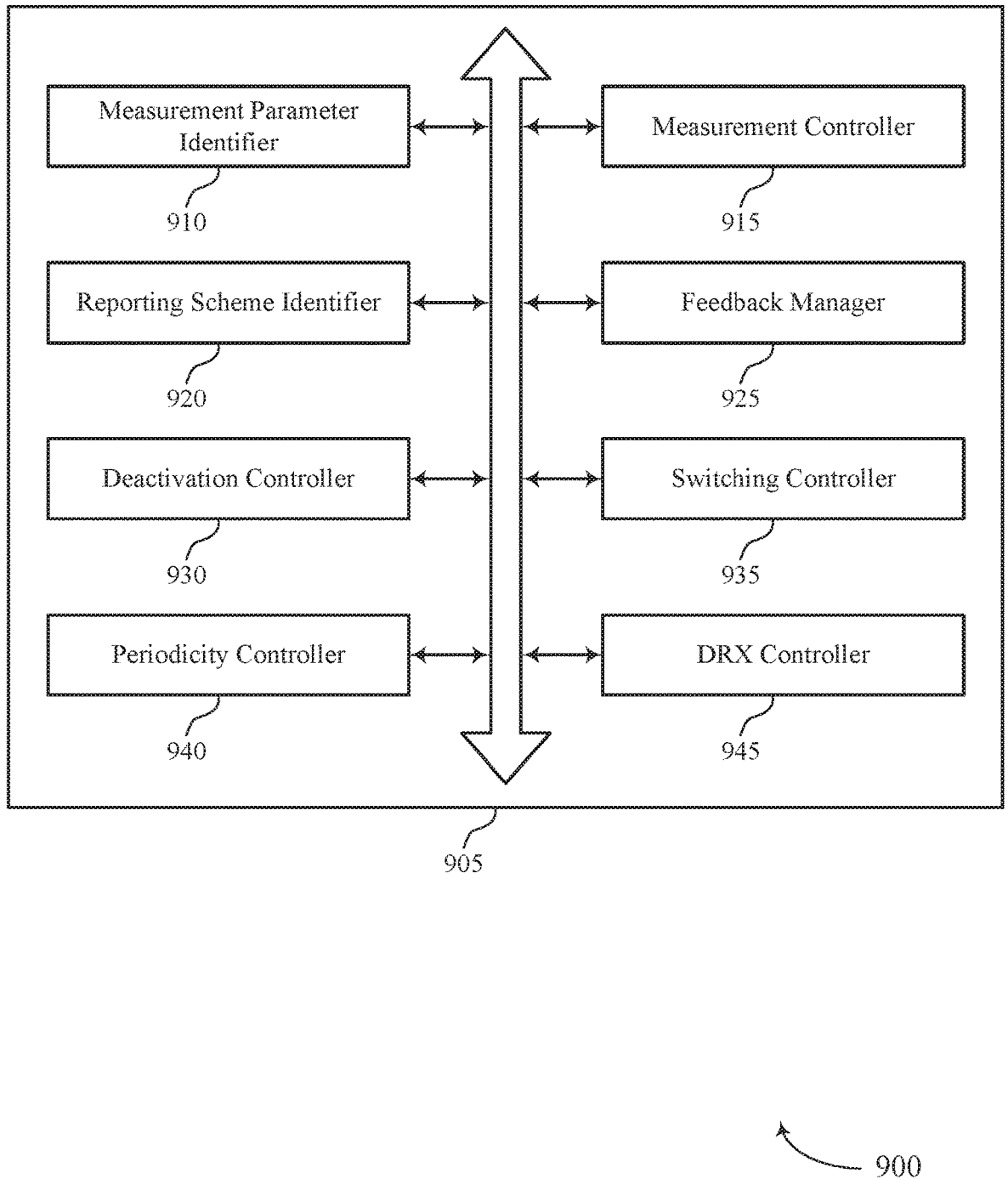
FIG. 9 shows a block diagram of a measurement configuration manager that supports adaptive monitoring in accordance with aspects of the present disclosure.

FIG. 9 shows a block diagram 900 of a measurement configuration manager 905 that supports adaptive monitoring in accordance with aspects of the present disclosure. The measurement configuration manager 905 may be an example of aspects of a measurement configuration manager 715, a measurement configuration manager 815, or a measurement configuration manager 1010 described herein. The measurement configuration manager 905 may include a measurement parameter identifier 910, a measurement controller 915, a reporting scheme identifier 920, a feedback manager 925, a deactivation controller 930, a switching controller 935, a periodicity controller 940, and a DRX controller 945. Each of these modules may communicate, directly or indirectly, with one another (e.g., via one or more buses).

The measurement parameter identifier 910 may receive, from a base station, a first message indicating a set of measurement configurations, each measurement configuration of the set of measurement configurations including different sets of measurement parameters used for measuring a RS of a cell. In some examples, the measurement parameter identifier 910 may receive, from a base station, a first message indicating a measurement configuration for measuring a RS of a cell. In some examples, the measurement parameter identifier 910 may receive, from a base station, a message indicating a measurement configuration for measuring a RS of a cell. In some examples, the measurement parameter identifier 910 may determine a set of measurement parameters of the first measurement configuration based on the second message indicating that the UE 115 activate the first measurement configuration.

In some examples, measurement parameter identifier 910 may identify that the set of measurement parameters includes a SMTC window configuration selected from a set of SMTC window configurations, the SMTC window configuration including a SMTC window periodicity, or a SMTC window size, or a SMTC window offset, or a combination thereof. In some examples, measurement parameter identifier 910 may identify that the set of measurement parameters includes a measurement gap configuration selected from a set of measurement gap configurations, the measurement gap configuration including a measurement gap periodicity, or a measurement gap size, or a combination thereof.

In some examples, measurement parameter identifier 910 may identify that the set of measurement parameters includes an RS measurement configuration for performing measurements of the RS of the cell, the RS measurement configuration including a measurement periodicity, or a measurement window size, or a combination thereof. In some examples, measurement parameter identifier 910 may identify that the set of measurement parameters includes a set of beams used for monitoring the RS, or an activation of inter-frequency measurements, or a deactivation of inter-frequency measurements, or a combination thereof.

In some examples, the measurement parameter identifier 910 may determine a set of measurement parameters of the first measurement configuration, where the set of measurement parameters of the first measurement configuration is different from a set of measurement parameters of the second measurement configuration. In some examples, the measurement parameter identifier 910 may receive the first message via RRC signaling. In some examples, the measurement parameter identifier 910 may receive the second message via DCI, or via a MAC GE, or via a different carrier, or via a different BWP, or a combination thereof. In some examples, the measurement parameter identifier 910 may determine one or more measurement occasions of the first set of measurement parameters based on the second message indicating that the UE 115 activate the first set of measurement parameters.

In some cases, the RS measurement configuration may correspond to a configuration of the RS of the cell or is independent of the configuration of the RS of the cell. In some cases, the RS measurement configuration may indicate different types of RSs to be measured. The RS may include at least one of a CSI-RS, or a SSB.

The measurement controller 9115 may receive, from the base station, a second message indicating that the UE 115 activate a first measurement configuration, deactivate the first measurement configuration, or switch to the first measurement configuration, where the first measurement configuration is from the set of measurement configurations. In some examples, the measurement controller 915 may receive, from the base station, a second message indicating that the UE 115 activate a first set of measurement parameters of the measurement configuration, deactivate the first set of measurement parameters, or switch to the first set of measurement parameters. In some examples, the measurement controller 915 may perform measurements of the RS in accordance with a first periodicity of the measurement configuration. In some examples, the measurement controller 915 may perform measurements of the RS of the cell in accordance with a second periodicity of the measurement configuration and based on the DRX mode, the first periodicity being different from the second periodicity. In some examples, the measurement controller 915 may perform measurements of the RS in accordance with the determined set of measurement parameters. In some examples, the measurement controller 915 may perform measurements of the RS using the first measurement configuration. In some examples, the measurement controller 915 may perform measurements of the RS using a second measurement configuration.

In some examples, the measurement controller 915 may measure the RS of the cell is for RRM procedures, or RIM procedures, or BM, or a combination thereof. In some examples, the measurement controller 915 may perform measurements of the RS in accordance with the determined periodicity of the first set of measurement parameters. In some examples, the measurement controller 915 may perform measurements of the RS in accordance with the determined one or more measurement occasions. In some examples, the measurement controller 915 may perform measurements of the RS using the first set of measurement parameters. In some examples, the measurement controller 915 may perform measurements of the RS using a second set of measurement parameters of the measurement configuration.

In some examples, the measurement controller 915 may perform measurements of the RS in accordance with the first periodicity, where the first periodicity is shorter than the second periodicity. The reporting scheme identifier 920 may determine a measurement reporting scheme based on the indication to activate, deactivate, or switch to the first measurement configuration. In some examples, the reporting scheme identifier 920 may determine a measurement reporting scheme based on the indication to activate, deactivate, or switch to the first set of measurement parameters.

The feedback manager 925 may transmit a measurement report to the base station 105 including measurements of the RS based on the measurement reporting scheme. In some examples, the feedback manager 925 may transmit an ACK in response to receiving the second message. In some examples, the feedback manager 925 may transmit a measurement report to the base station including measurements of the RS based on the measurement reporting scheme.

The deactivation controller 930 may stop measurements of the RS using the first measurement configuration based on the second message indicating that the UE 115 deactivate the first measurement configuration. In some examples, the deactivation controller 930 may stop measurements of the RS using the first set of measurement parameters based on the second message indicating that the UE 115 deactivate the first set of measurement parameters.

The switching controller 935 may switch to the first measurement configuration based on the second message indicating that the UE 115 switch to the first measurement configuration. In some examples, the switching controller 935 may switch from the second set of measurement parameters to the first set of measurement parameters based on the second message indicating that the UE 115 switch to the first set of measurement parameters, where the first set of measurement parameters has a different periodicity than a periodicity of the second set of measurement parameters, or has a different one or more measurement occasions than measurement occasions of the second set of measurement parameters, or a combination thereof.

The periodicity controller 940 may determine a periodicity of the first set of measurement parameters based on the second message indicating that the UE 115 activate the first set of measurement parameters. In some examples, the measurement occasions corresponding to the second periodicity are based on a periodicity of the DRX mode. In some cases, the second periodicity is associated with a periodicity of the DRX mode. The DRX controller 945 may configure a UE 115 to enter into a DRX mode. In some examples, the DRX controller 945 may configure the UE 115 to exit the DRX mode.

Figure 10:
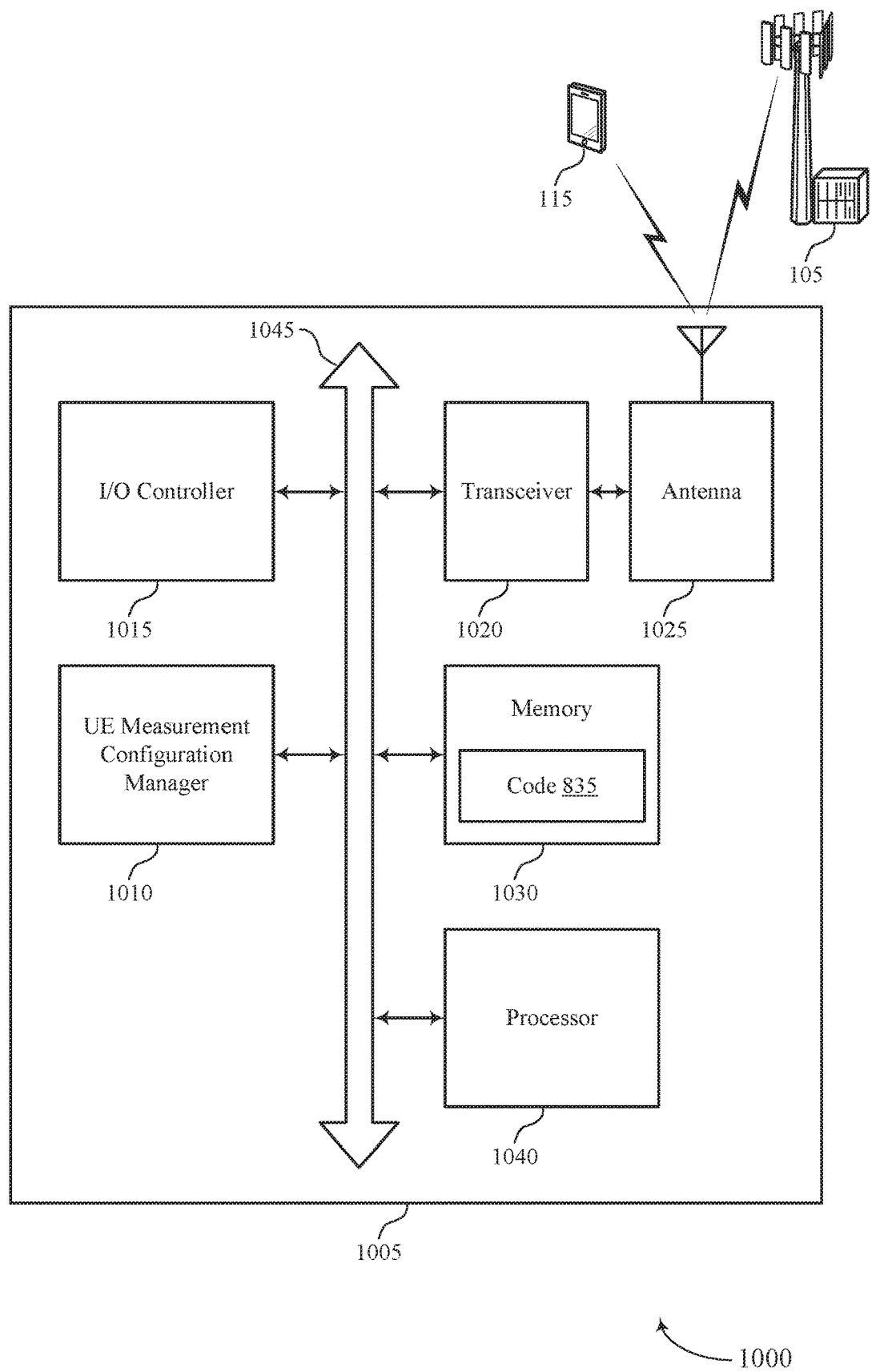
FIG. 10 shows a diagram of a system including a device that supports adaptive monitoring in accordance with aspects of the present disclosure.

FIG. 10 shows a diagram of a system 1000 including a device 1005 that supports adaptive monitoring in accordance with aspects of the present disclosure. The device 1005 may be an example of or include the components of device 705, device 805, or a UE 115 as described herein. The device 1005 may include components for bi-directional voice and data communications including components for transmitting and receiving communications, including a measurement configuration manager 1010, an I/O controller 1015, a transceiver 1020, an antenna 1025, memory 1030, and a processor 1040. These components may be in electronic communication via one or more buses (e.g., bus 1045).

The measurement configuration manager 1010 may receive, from a base station 105, a first message indicating a set of measurement configurations, each measurement configuration of the set of measurement configurations including different sets of measurement parameters used for measuring a RS of a cell, receive, from the base station 105, a second message indicating that the UE 115 activate a first measurement configuration, deactivate the first measurement configuration, or switch to the first measurement configuration, where the first measurement configuration is from the set of measurement configurations, and determine a measurement reporting scheme based on the indication to activate, deactivate, or switch to the first measurement configuration.

The measurement configuration manager 1010 may also receive, from a base station 105, a first message indicating a measurement configuration for measuring a RS of a cell, receive, from the base station 105, a second message indicating that the UE 115 activate a first set of measurement parameters of the measurement configuration, deactivate the first set of measurement parameters, or switch to the first set of measurement parameters, and determine a measurement reporting scheme based on the indication to activate, deactivate, or switch to the first set of measurement parameters.

The measurement configuration manager 1010 may also receive, from a base station 105, a message indicating a measurement configuration for measuring a RS of a cell, perform measurements of the RS in accordance with a first periodicity of the measurement configuration, perform measurements of the RS of the cell in accordance with a second periodicity of the measurement configuration and based on the DRX mode, the first periodicity being different from the second periodicity, and enter into a DRX mode.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting adaptive monitoring).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
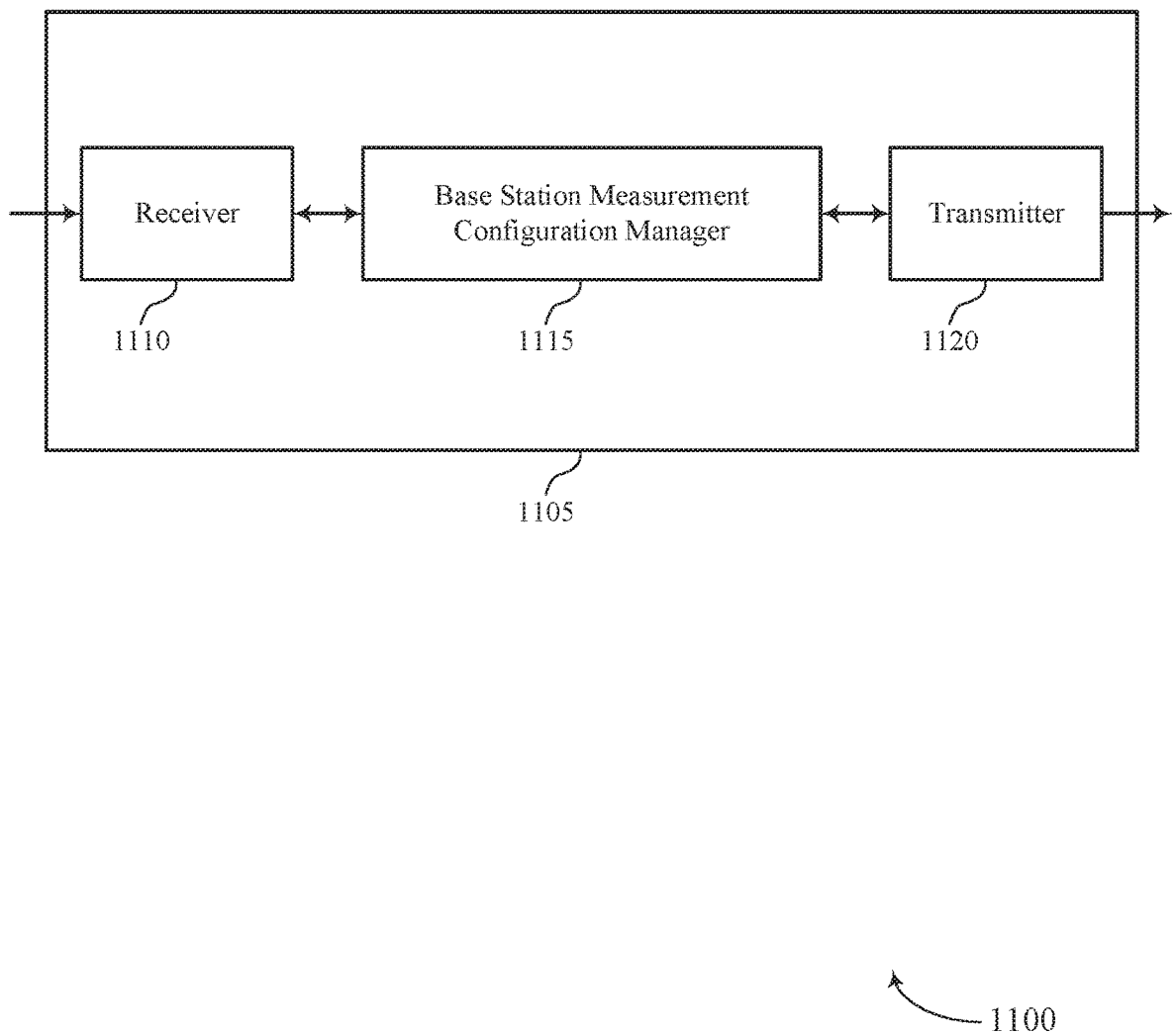
FIGS. 11 and 12 show block diagrams of devices that support adaptive monitoring in accordance with aspects of the present disclosure.

FIG. 11 shows a block diagram 1100 of a device 1105 that supports adaptive monitoring in accordance with aspects of the present disclosure. The device 1105 may be an example of aspects of a base station 105 as described herein. The device 1105 may include a receiver 1110, a measurement configuration manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to adaptive monitoring, etc.). Information may be passed on to other components of the device 1105. The receiver 1110 may be an example of aspects of the transceiver 1420 described with reference to FIG. 14. The receiver 1110 may utilize a single antenna or a set of antennas.

The measurement configuration manager 1115 may determine a set of measurement configurations, each measurement configuration of the set of measurement configurations including different sets of measurement parameters for a UE 115 to measure a RS of a cell, select a first measurement configuration from the set of measurement configurations based on the determined communications conditions at the UE 115, determine communications conditions at the UE 115, and transmit, to the UE 115, a message indicating that the UE 115 activate the first measurement configuration, deactivate the first measurement configuration, or switch to the first measurement configuration. The measurement configuration manager 1115 may be an example of aspects of the measurement configuration manager 1410 described herein.

The measurement configuration manager 1115, or its sub-components, may be implemented in hardware, code (e.g., software or firmware) executed by a processor, or any combination thereof. If implemented in code executed by a processor, the functions of the measurement configuration manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The measurement configuration manager 1115, or its sub-components, may be physically located at various positions, including being distributed such that portions of functions are implemented at different physical locations by one or more physical components. In some examples, the measurement configuration manager 1115, or its sub-components, may be a separate and distinct component in accordance with various aspects of the present disclosure. In some examples, the measurement configuration manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
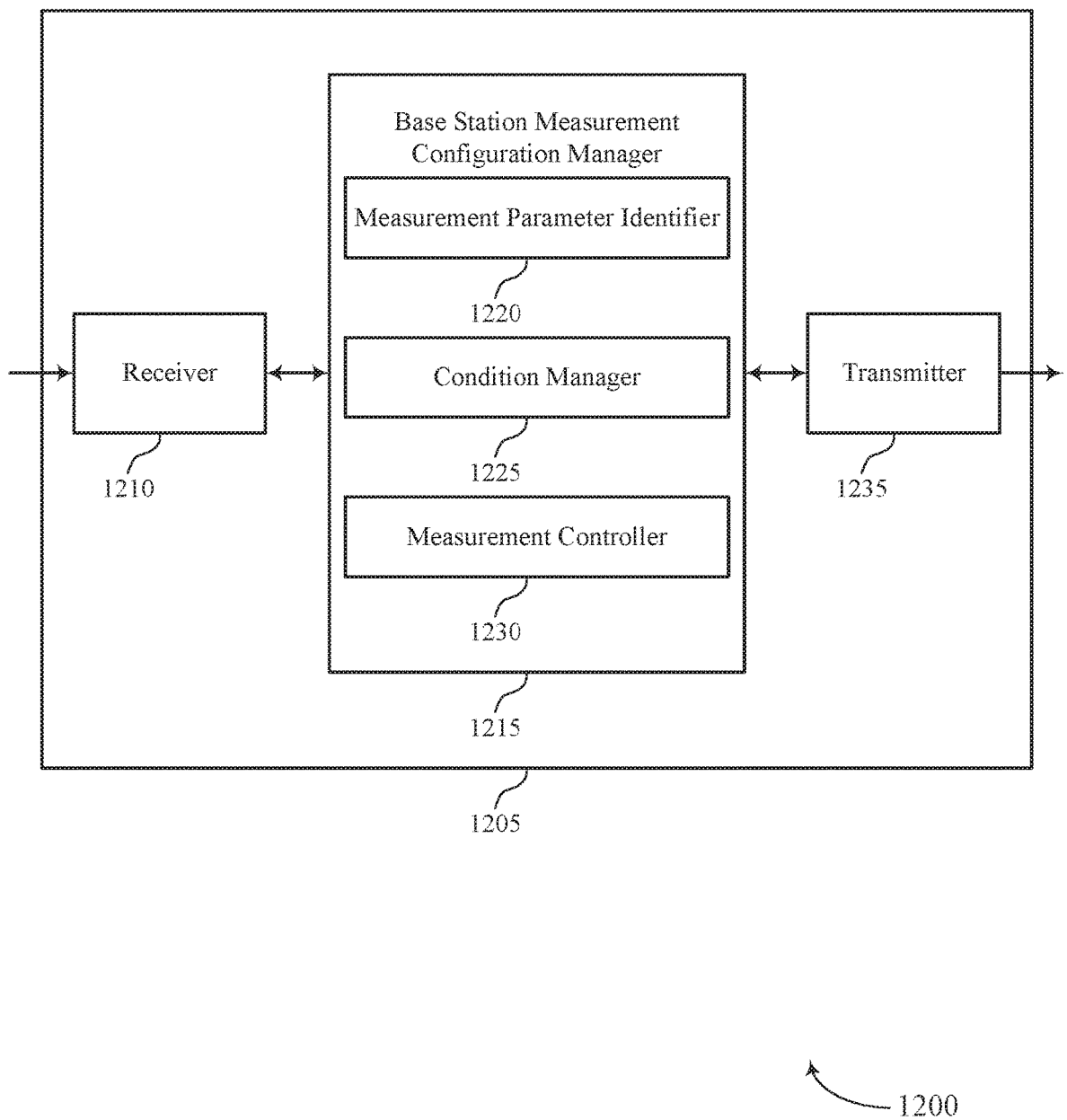

FIG. 12 shows a block diagram 1200 of a device 1205 that supports adaptive monitoring in accordance with aspects of the present disclosure. The device 1205 may be an example of aspects of a device 1105 or a base station 105 as described herein. The device 1205 may include a receiver 1210, a measurement configuration manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to adaptive monitoring, etc.). Information may be passed on to other components of the device 1205. The receiver 1210 may be an example of aspects of the transceiver 1420 described with reference to FIG. 14. The receiver 1210 may utilize a single antenna or a set of antennas.

The measurement configuration manager 1215 may be an example of aspects of the measurement configuration manager 1115 as described herein. The measurement configuration manager 1215 may include a measurement parameter identifier 1220, a condition manager 1225, and a measurement controller 1230. The measurement configuration manager 1215 may be an example of aspects of the measurement configuration manager 1410 described herein.

The measurement parameter identifier 1220 may determine a set of measurement configurations, each measurement configuration of the set of measurement configurations including different sets of measurement parameters for a UE 115 to measure a RS of a cell and select a first measurement configuration from the set of measurement configurations based on the determined communications conditions at the UE 115. The condition manager 1225 may determine communications conditions at the UE 115. The measurement controller 1230 may transmit, to the UE 115, a message indicating that the UE 115 activate the first measurement configuration, deactivate the first measurement configuration, or switch to the first measurement configuration.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
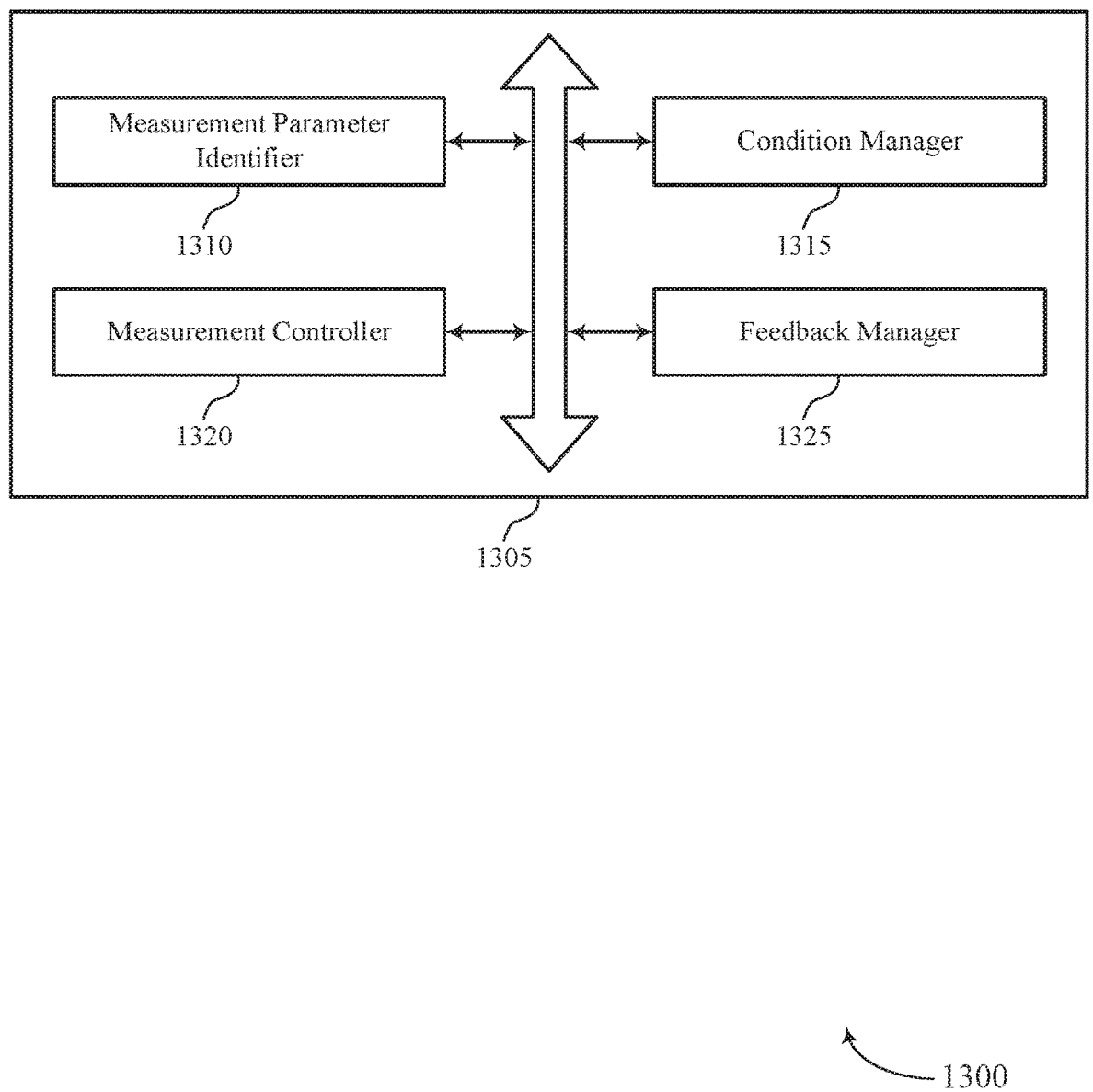
FIG. 13 shows a block diagram of a measurement configuration manager that supports adaptive monitoring in accordance with aspects of the present disclosure.

FIG. 13 shows a block diagram 1300 of a measurement configuration manager 1305 that supports adaptive monitoring in accordance with aspects of the present disclosure. The measurement configuration manager 1305 may be an example of aspects of a measurement configuration manager 1115, a measurement configuration manager 1215, or a measurement configuration manager 1410 described herein. The measurement configuration manager 1305 may include a measurement parameter identifier 1310, a condition manager 1315, a measurement controller 1320, and a feedback manager 1325. Each of these modules may communicate, directly or indirectly, with one another (e.g., via one or more buses).

The measurement parameter identifier 1310 may determine a set of measurement configurations, each measurement configuration of the set of measurement configurations including different sets of measurement parameters for a UE 115 to measure a RS of a cell. In some examples, the measurement parameter identifier 1310 may select a first measurement configuration from the set of measurement configurations based on the determined communications conditions at the UE 115. In some examples, the measurement parameter identifier 1310 may transmit, to the UE 115, a first message indicating the set of measurement configurations, where the first message is transmitted via RRC signaling.

In some examples, the set of measurement parameters includes a SMTC window configuration selected from a set of SMTC window configurations, the first SMTC window configuration including a SMTC window periodicity, or a SMTC window size, or a SMTC window offset, or a combination thereof. In some cases, the set of measurement parameters includes a first measurement gap configuration selected from a set of measurement gap configurations, the first measurement gap configuration including a measurement gap periodicity, or a measurement gap size, or a combination thereof.

In some cases, the set of measurement parameters includes an RS measurement configuration for performing measurements of the RS of the cell, the RS measurement configuration including a measurement periodicity, or a measurement window size, or a combination thereof. In some cases, the RS measurement configuration corresponds to a configuration of the RS of the cell or is independent of the configuration of the RS of the cell. In some cases, the RS measurement configuration indicates different types of RSs to be measured. In some cases, the set of measurement parameters includes a set of beams used for monitoring the RS, or an activation of inter-frequency measurements, or a deactivation of inter-frequency measurements, or a combination thereof.

The Condition Manager 1315 may determine communications conditions at the UE 115. In some cases, the communications conditions at the UE 115 include one or more of a beam quality at the UE 115, or a mobility condition of the UE 115, or a measurement frequency of the UE 115, or a measurement type performed by the UE 115.

The measurement controller 1320 may transmit, to the UE 115, a message indicating that the UE 115 activate the first measurement configuration, deactivate the first measurement configuration, or switch to the first measurement configuration. In some examples, the measurement controller 1320 may transmit the message via DCI, or via a MAC-CE, or via a different carrier, or via a different BWP, or a combination thereof.

The feedback manager 1325 may receive, from the UE 115, a measurement report based on a set of measurement parameters of the first measurement configuration, where the message indicates that the UE 115 activate the first measurement configuration. In some examples, the feedback manager 1325 may receive, from the UE 115, a first measurement report based on a set of measurement parameters of a second measurement configuration. In some examples, the feedback manager 1325 may receive, from the UE 115, a second measurement report based on a set of measurement parameters of the first measurement configuration, where the message indicates that the UE 115 switch to the first measurement configuration. In some examples, the feedback manager 1325 may receive an ACK in response to the message.

Figure 14:
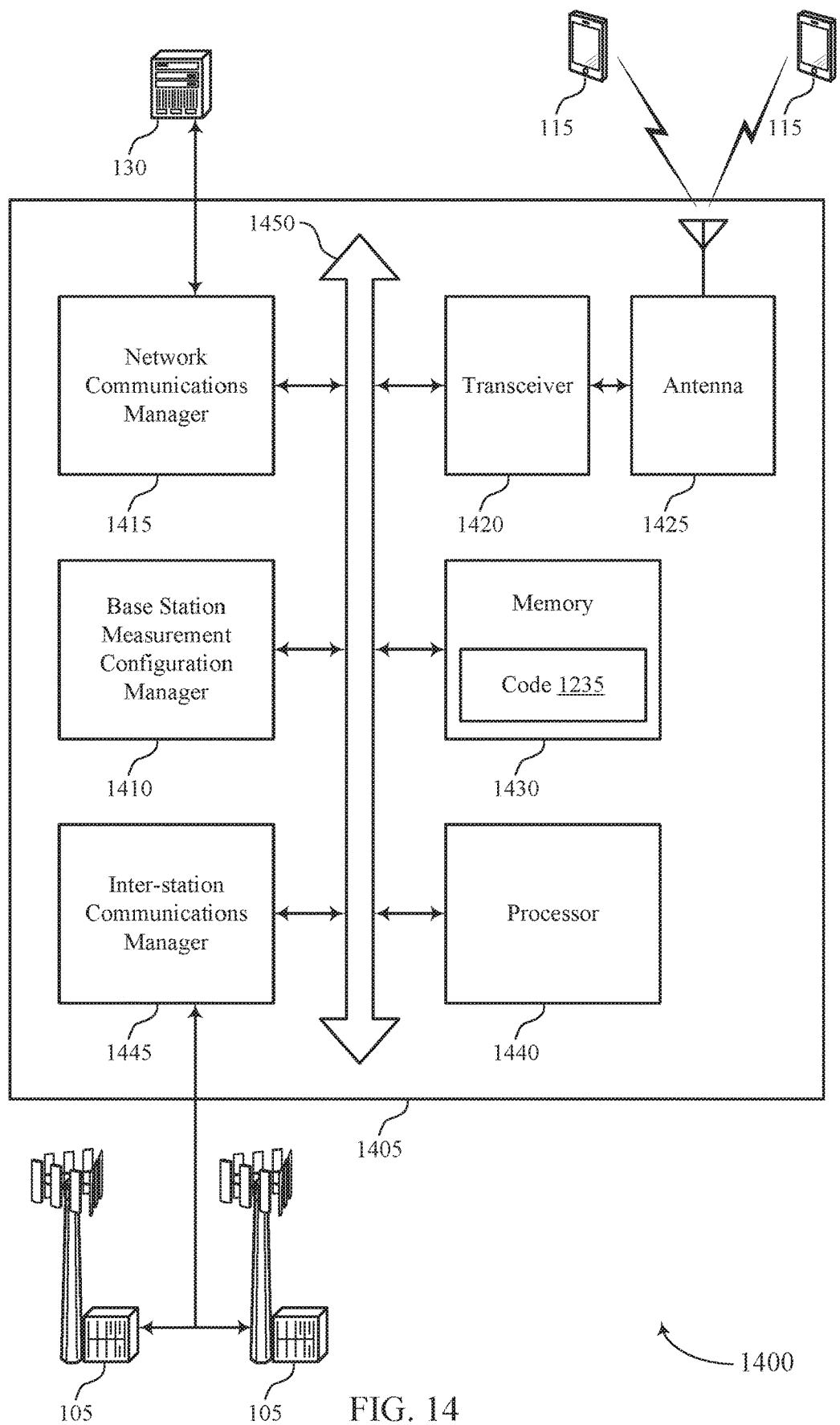
FIG. 14 shows a diagram of a system including a device that supports adaptive monitoring in accordance with aspects of the present disclosure.

FIG. 14 shows a diagram of a system 1400 including a device 1405 that supports adaptive monitoring in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a measurement configuration manager 1410, a network communications manager 1415, a transceiver 1420, an antenna 1425, memory 1430, a processor 1440, and an inter-station communications manager 1445. These components may be in electronic communication via one or more buses (e.g., bus 1450).

The measurement configuration manager 1410 may determine a set of measurement configurations, each measurement configuration of the set of measurement configurations including different sets of measurement parameters for a UE 115 to measure a RS of a cell, select a first measurement configuration from the set of measurement configurations based on the determined communications conditions at the UE 115, determine communications conditions at the UE 115, and transmit, to the UE 115, a message indicating that the UE 115 activate the first measurement configuration, deactivate the first measurement configuration, or switch to the first measurement configuration.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate hi-directionally with another wireless transceiver. The transceiver 1420 may also include a modem to modulate the packets and provide the modulated packets to the antennas for transmission, and to demodulate packets received from the antennas. In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting adaptive monitoring).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
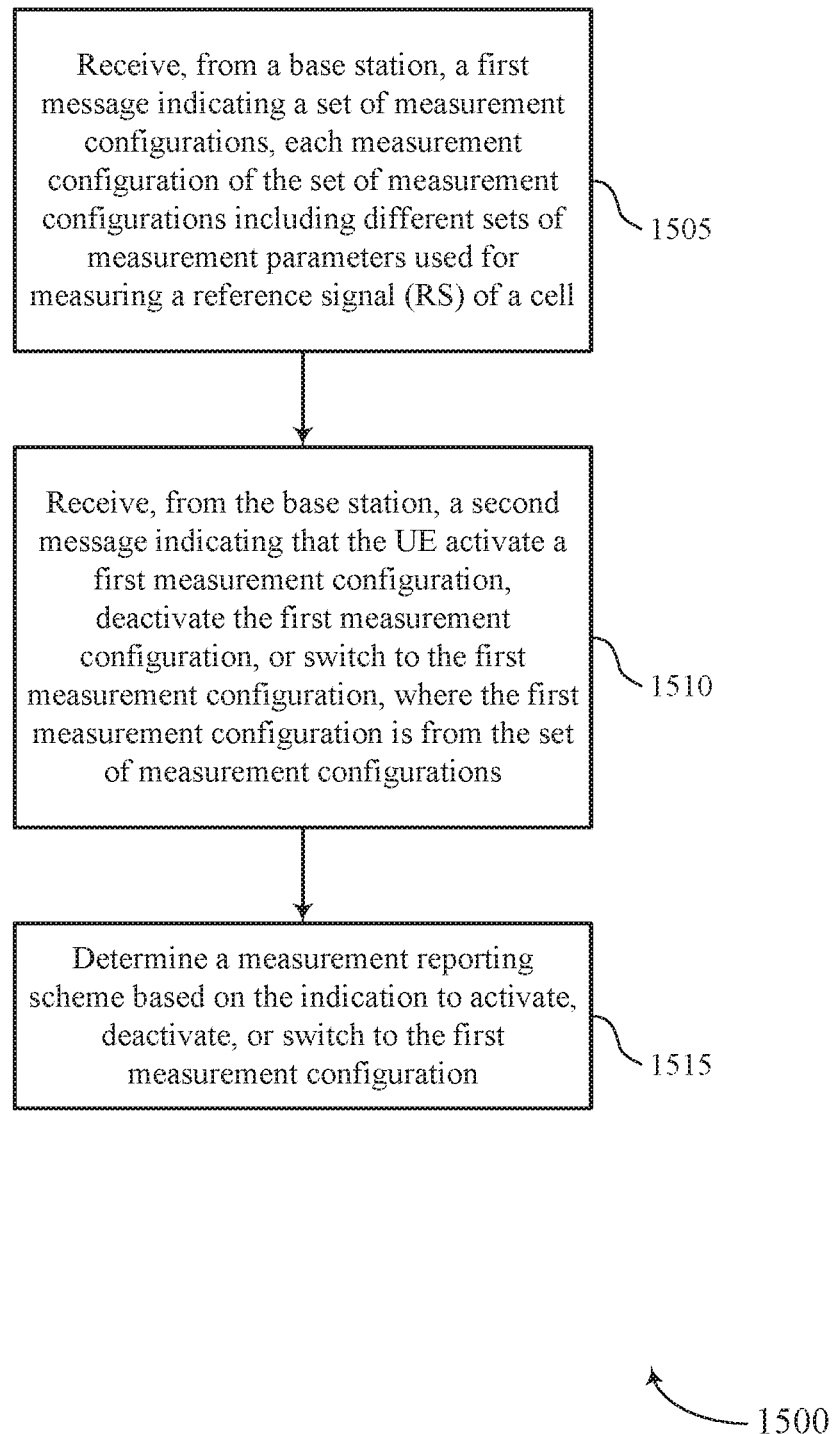
FIGS. 15 through 21 show flowcharts illustrating methods that support adaptive monitoring in accordance with aspects of the present disclosure.

FIG. 15 shows a flowchart illustrating a method 15000 that supports adaptive monitoring in accordance with aspects of the present disclosure. The operations of method 1500 may be implemented by a UE 115 or its components as described herein. For example, the operations of method 1500 may be performed by a measurement configuration manager as described with reference to FIGS. 7 through 10. In some examples, a UE 115 may execute a set of instructions to control the functional elements of the UE 115 to perform the functions described herein. Additionally or alternatively, a UE 115 may perform aspects of the functions described herein using special-purpose hardware.

At 1505, the UE 115 may receive, from a base station, a first message indicating a set of measurement configurations, each measurement configuration of the set of measurement configurations including different sets of measurement parameters used for measuring a RS of a cell. The operations of 1505 may be performed according to the methods described herein. In some examples, aspects of the operations of 1505 may be performed by a measurement parameter identifier as described with reference to FIGS. 7 through 10.

At 1510, the UE 115 may receive, from the base station, a second message indicating that the UE 115 activate a first measurement configuration, deactivate the first measurement configuration, or switch to the first measurement configuration, where the first measurement configuration is from the set of measurement configurations. The operations of 1510 may be performed according to the methods described herein. In some examples, aspects of the operations of 1510 may be performed by a measurement controller as described with reference to FIGS. 7 through 10.

At 1515, the UE 115 may determine a measurement reporting scheme based on the indication to activate, deactivate, or switch to the first measurement configuration. The operations of 1515 may be performed according to the methods described herein. In some examples, aspects of the operations of 1515 may be performed by a reporting scheme identifier as described with reference to FIGS. 7 through 10.

Figure 16:
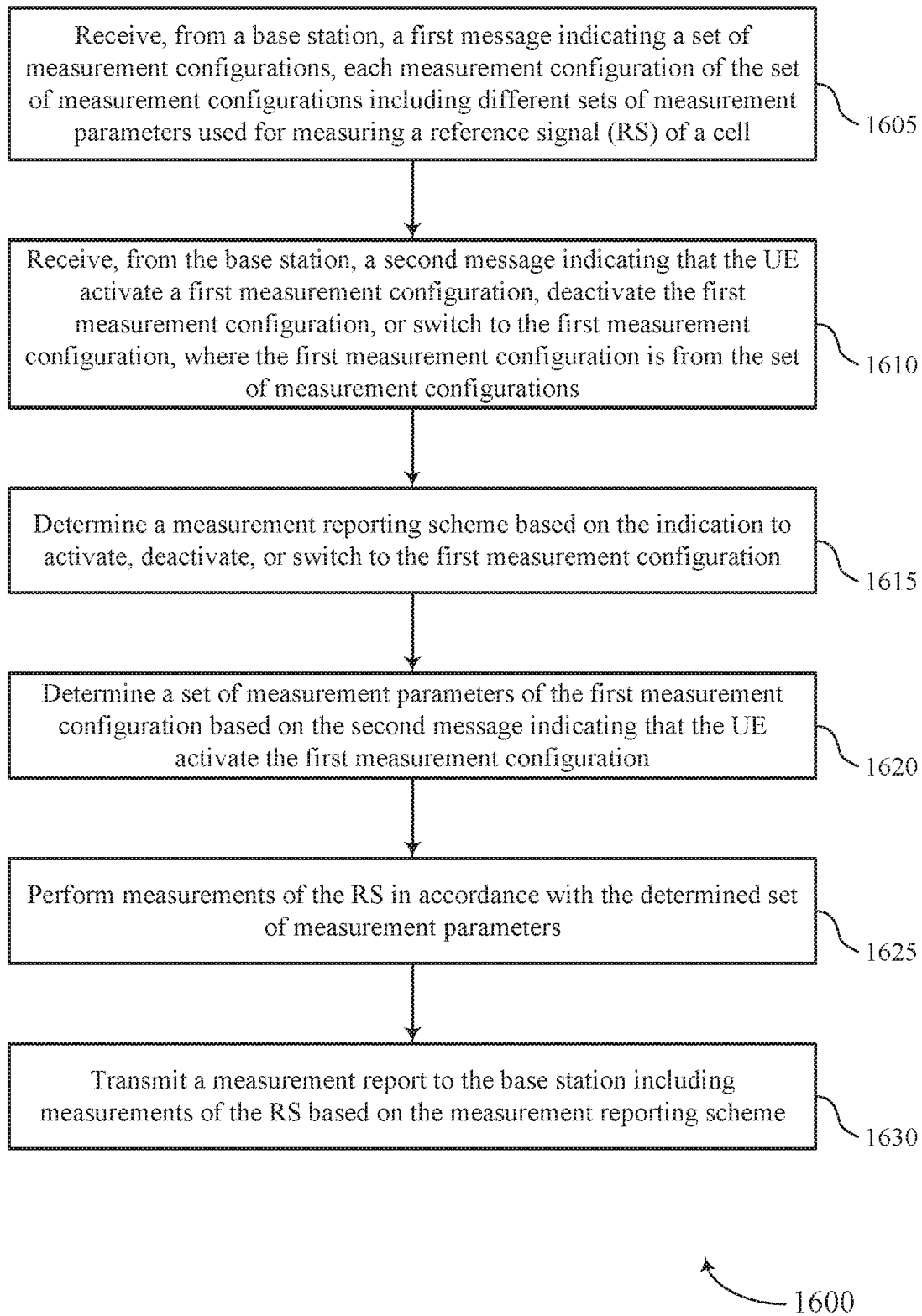

FIG. 16 shows a flowchart illustrating a method 1600 that supports adaptive monitoring in accordance with aspects of the present disclosure. The operations of method 1600 may be implemented by a UE 115 or its components as described herein. For example, the operations of method 1600 may be performed by a measurement configuration manager as described with reference to FIGS. 7 through 10. In some examples, a UE 115 may execute a set of instructions to control the functional elements of the UE 115 to perform the functions described herein. Additionally or alternatively, a UE 115 may perform aspects of the functions described herein using special-purpose hardware.

At 1605, the UE 115 may receive, from a base station, a first message indicating a set of measurement configurations, each measurement configuration of the set of measurement configurations including different sets of measurement parameters used for measuring a RS of a cell. The operations of 1605 may be performed according to the methods described herein. In some examples, aspects of the operations of 1605 may be performed by a measurement parameter identifier as described with reference to FIGS. 7 through 10.

At 1610, the UE 115 may receive, from the base station, a second message indicating that the UE 115 activate a first measurement configuration, deactivate the first measurement configuration, or switch to the first measurement configuration, where the first measurement configuration is from the set of measurement configurations. The operations of 1610 may be performed according to the methods described herein. In some examples, aspects of the operations of 1610 may be performed by a measurement controller as described with reference to FIGS. 7 through 10.

At 1615, the UE 115 may determine a measurement reporting scheme based on the indication to activate, deactivate, or switch to the first measurement configuration. The operations of 1615 may be performed according to the methods described herein. In some examples, aspects of the operations of 1615 may be performed by a reporting scheme identifier as described with reference to FIGS. 7 through 10.

At 1620, the UE 115 may determine a set of measurement parameters of the first measurement configuration based on the second message indicating that the UE 115 activate the first measurement configuration. The operations of 1620 may be performed according to the methods described herein. In some examples, aspects of the operations of 1620 may be performed by a measurement parameter identifier as described with reference to FIGS. 7 through 10.

At 1625, the UE 115 may perform measurements of the RS in accordance with the determined set of measurement parameters. The operations of 1625 may be performed according to the methods described herein. In some examples, aspects of the operations of 1625 may be performed by a measurement controller as described with reference to FIGS. 7 through 10.

At 1630, the UE 115 may transmit a measurement report to the base station including measurements of the RS based on the measurement reporting scheme. The operations of 1630 may be performed according to the methods described herein. In some examples, aspects of the operations of 1630 may be performed by a feedback manager as described with reference to FIGS. 7 through 10.

Figure 17:
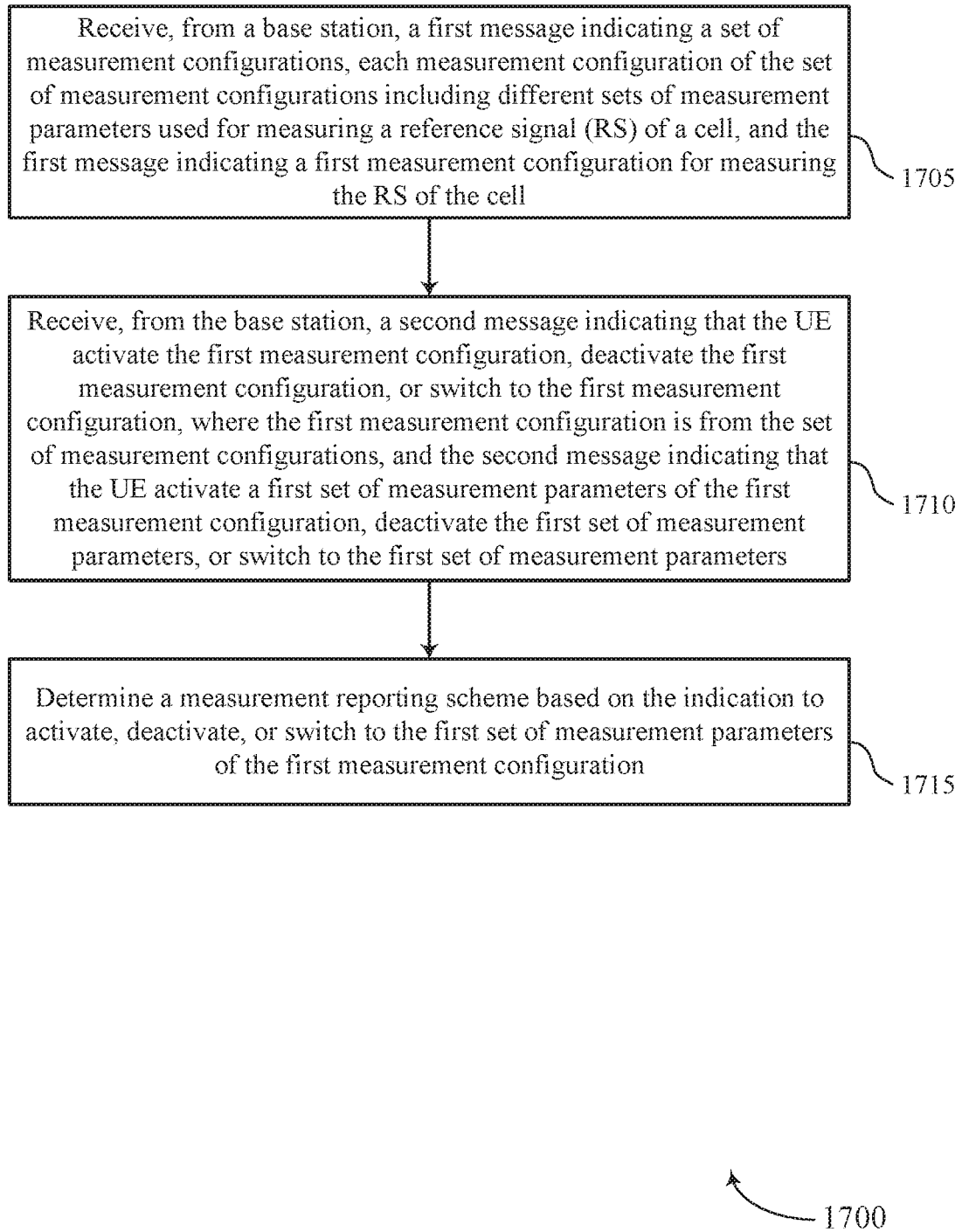

FIG. 17 shows a flowchart illustrating a method 1700 that supports adaptive monitoring in accordance with aspects of the present disclosure. The operations of method 1700 may be implemented by a UE 115 or its components as described herein. For example, the operations of method 1700 may be performed by a measurement configuration manager as described with reference to FIGS. 7 through 10. In some examples, a UE 115 may execute a set of instructions to control the functional elements of the UE 115 to perform the functions described herein. Additionally or alternatively, a UE 115 may perform aspects of the functions described herein using special-purpose hardware.

At 1705, the UE 115 may receive, from a base station, a first message indicating a set of measurement configurations, each measurement configuration of the set of measurement configurations including different sets of measurement parameters used for measuring a RS of a cell, and the first message indicating a first measurement configuration for measuring the RS of the cell. The operations of 1705 may be performed according to the methods described herein. In some examples, aspects of the operations of 1705 may be performed by a measurement parameter identifier as described with reference to FIGS. 7 through 10.

At 1710, the UE 115 may receive, from the base station, a second message indicating that the UE 115 activate the first measurement configuration, deactivate the first measurement configuration, or switch to the first measurement configuration, where the first measurement configuration is from the set of measurement configurations, and the second message indicating that the UE 115 activate a first set of measurement parameters of the first measurement configuration, deactivate the first set of measurement parameters, or switch to the first set of measurement parameters. The operations of 1710 may be performed according to the methods described herein. In some examples, aspects of the operations of 1710 may be performed by a measurement controller as described with reference to FIGS. 7 through 10.

At 1715, the UE 115 may determine a measurement reporting scheme based on the indication to activate, deactivate, or switch to the first set of measurement parameters of the first measurement configuration. The operations of 1715 may be performed according to the methods described herein. In some examples, aspects of the operations of 1715 may be performed by a reporting scheme identifier as described with reference to FIGS. 7 through 10.

Figure 18:
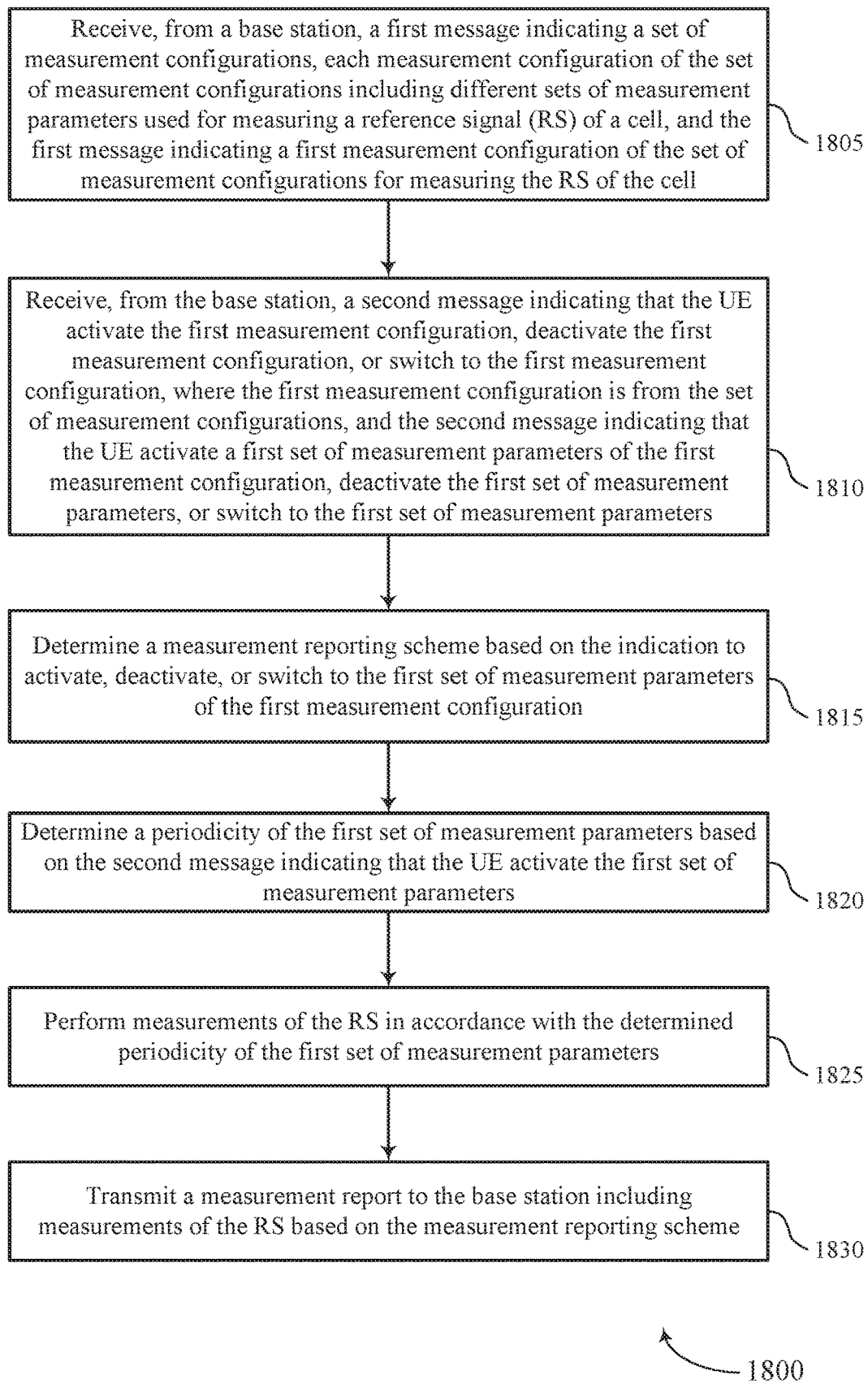

FIG. 18 shows a flowchart illustrating a method 1800 that supports adaptive monitoring in accordance with aspects of the present disclosure. The operations of method 1800 may be implemented by a UE 115 or its components as described herein. For example, the operations of method 1800 may be performed by a measurement configuration manager as described with reference to FIGS. 7 through 10. In some examples, a UE 115 may execute a set of instructions to control the functional elements of the UE 115 to perform the functions described herein. Additionally or alternatively, a UE 115 may perform aspects of the functions described herein using special-purpose hardware.

At 1805, the UE 115 may receive, from a base station, a first message indicating a set of measurement configurations, each measurement configuration of the set of measurement configurations including different sets of measurement parameters used for measuring a RS of a cell, and the first message indicating a measurement configuration for measuring the RS of the cell. The operations of 1805 may be performed according to the methods described herein. In some examples, aspects of the operations of 1805 may be performed by a measurement parameter identifier as described with reference to FIGS. 7 through 10.

At 1810, the UE 115 may receive, from the base station, a second message indicating that the UE 115 activate the first measurement configuration, deactivate the first measurement configuration, or switch to the first measurement configuration, where the first measurement configuration is from the set of measurement configurations, and the second message indicating that the UE 115 activate a first set of measurement parameters of the first measurement configuration, deactivate the first set of measurement parameters, or switch to the first set of measurement parameters. The operations of 1810 may be performed according to the methods described herein. In some examples, aspects of the operations of 1810 may be performed by a measurement controller as described with reference to FIGS. 7 through 10.

At 1815, the UE 115 may determine a measurement reporting scheme based on the indication to activate, deactivate, or switch to the first set of measurement parameters of the first measurement configuration. The operations of 1815 may be performed according to the methods described herein. In some examples, aspects of the operations of 1815 may be performed by a reporting scheme identifier as described with reference to FIGS. 7 through 10.

At 1820, the UE 115 may determine a periodicity of the first set of measurement parameters based on the second message indicating that the UE 115 activate the first set of measurement parameters. The operations of 1820 may be performed according to the methods described herein. In some examples, aspects of the operations of 1820 may be performed by a periodicity controller as described with reference to FIGS. 7 through 10.

At 1825, the UE 115 may perform measurements of the RS in accordance with the determined periodicity of the first set of measurement parameters. The operations of 1825 may be performed according to the methods described herein. In some examples, aspects of the operations of 1825 may be performed by a measurement controller as described with reference to FIGS. 7 through 10.

At 1830, the UE 115 may transmit a measurement report to the base station including measurements of the RS based on the measurement reporting scheme. The operations of 1830 may be performed according to the methods described herein. In some examples, aspects of the operations of 1830 may be performed by a feedback manager as described with reference to FIGS. 7 through 10.

Figure 19:
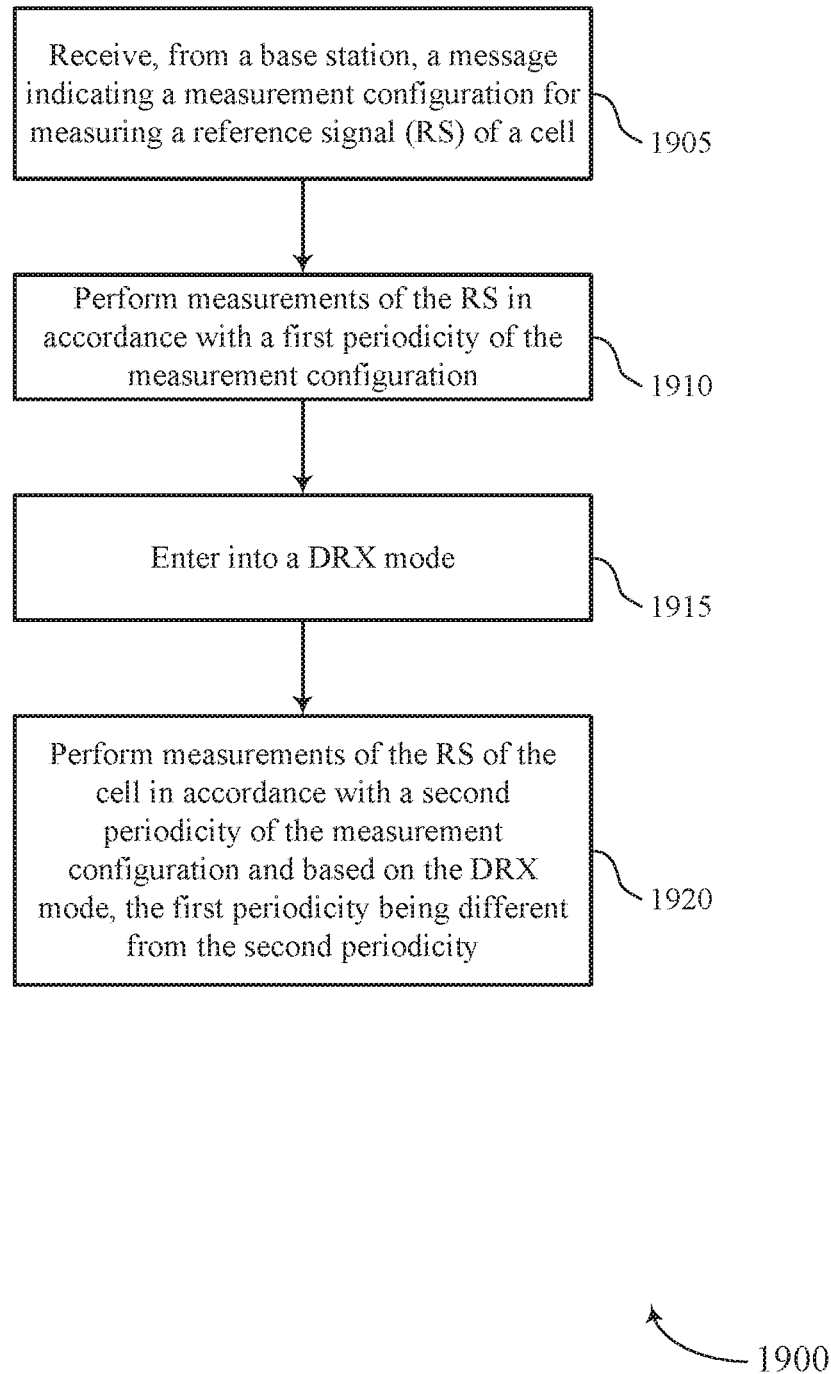

FIG. 19 shows a flowchart illustrating a method 1900 that supports adaptive monitoring in accordance with aspects of the present disclosure. The operations of method 1900 may be implemented by a UE 115 or its components as described herein. For example, the operations of method 1900 may be performed by a measurement configuration manager as described with reference to FIGS. 7 through 10. In some examples, a UE 115 may execute a set of instructions to control the functional elements of the UE 115 to perform the functions described herein. Additionally or alternatively, a UE 115 may perform aspects of the functions described herein using special-purpose hardware.

At 1905, the UE 115 may receive, from a base station, a message indicating a measurement configuration for measuring a RS of a cell. The operations of 1905 may be performed according to the methods described herein. In some examples, aspects of the operations of 1905 may be performed by a measurement parameter identifier as described with reference to FIGS. 7 through 10.

At 1910, the UE 115 may perform measurements of the RS in accordance with a first periodicity of the measurement configuration. The operations of 1910 may be performed according to the methods described herein. In some examples, aspects of the operations of 1910 may be performed by a measurement controller as described with reference to FIGS. 7 through 10.

At 1915, the UE 115 may enter into a DRX mode. The operations of 1915 may be performed according to the methods described herein. In some examples, aspects of the operations of 1915 may be performed by a DRX controller as described with reference to FIGS. 7 through 10.

At 1920, the UE 115 may perform measurements of the RS of the cell in accordance with a second periodicity of the measurement configuration and based on the DRX mode, the first periodicity being different from the second periodicity. The operations of 1920 may be performed according to the methods described herein. In some examples, aspects of the operations of 1920 may be performed by a measurement controller as described with reference to FIGS. 7 through 10.

Figure 20:
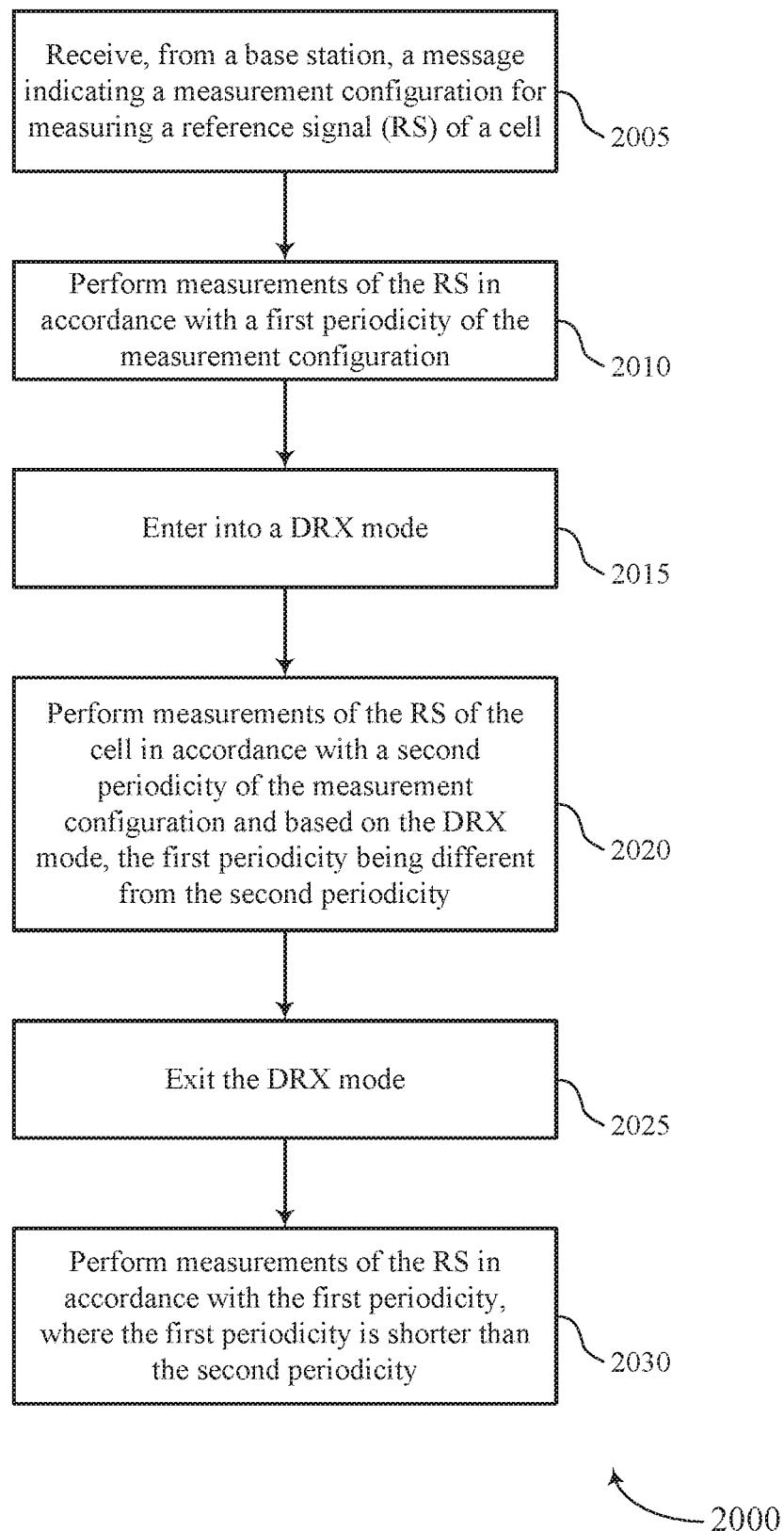

FIG. 20 shows a flowchart illustrating a method 2000 that supports adaptive monitoring in accordance with aspects of the present disclosure. The operations of method 2000 may be implemented by a UE 115 or its components as described herein. For example, the operations of method 2000 may be performed by a measurement configuration manager as described with reference to FIGS. 7 through 10. In some examples, a UE 115 may execute a set of instructions to control the functional elements of the UE 115 to perform the functions described herein. Additionally or alternatively, a UE 115 may perform aspects of the functions described herein using special-purpose hardware.

At 2005, the UE 115 may receive, from a base station, a message indicating a measurement configuration for measuring a RS of a cell. The operations of 2005 may be performed according to the methods described herein. In some examples, aspects of the operations of 2005 may be performed by a measurement parameter identifier as described with reference to FIGS. 7 through 10.

At 2010, the UE 115 may perform measurements of the RS in accordance with a first periodicity of the measurement configuration. The operations of 2010 may be performed according to the methods described herein. In some examples, aspects of the operations of 2010 may be performed by a measurement controller as described with reference to FIGS. 7 through 10.

At 2015, the UE 115 may enter into a DRX mode. The operations of 2015 may be performed according to the methods described herein. In some examples, aspects of the operations of 2015 may be performed by a DRX controller as described with reference to FIGS. 7 through 10.

At 2020, the UE 115 may perform measurements of the RS of the cell in accordance with a second periodicity of the measurement configuration and based on the DRX mode, the first periodicity being different from the second periodicity. The operations of 2020 may be performed according to the methods described herein. In some examples, aspects of the operations of 2020 may be performed by a measurement controller as described with reference to FIGS. 7 through 10.

At 2025, the UE 115 may exit the DRX mode. The operations of 2025 may be performed according to the methods described herein. In some examples, aspects of the operations of 2025 may be performed by a DRX controller as described with reference to FIGS. 7 through 10.

At 2030, the UE 115 may perform measurements of the RS in accordance with the first periodicity, where the first periodicity is shorter than the second periodicity. The operations of 2030 may be performed according to the methods described herein. In some examples, aspects of the operations of 2030 may be performed by a measurement controller as described with reference to FIGS. 7 through 10.

Figure 21:
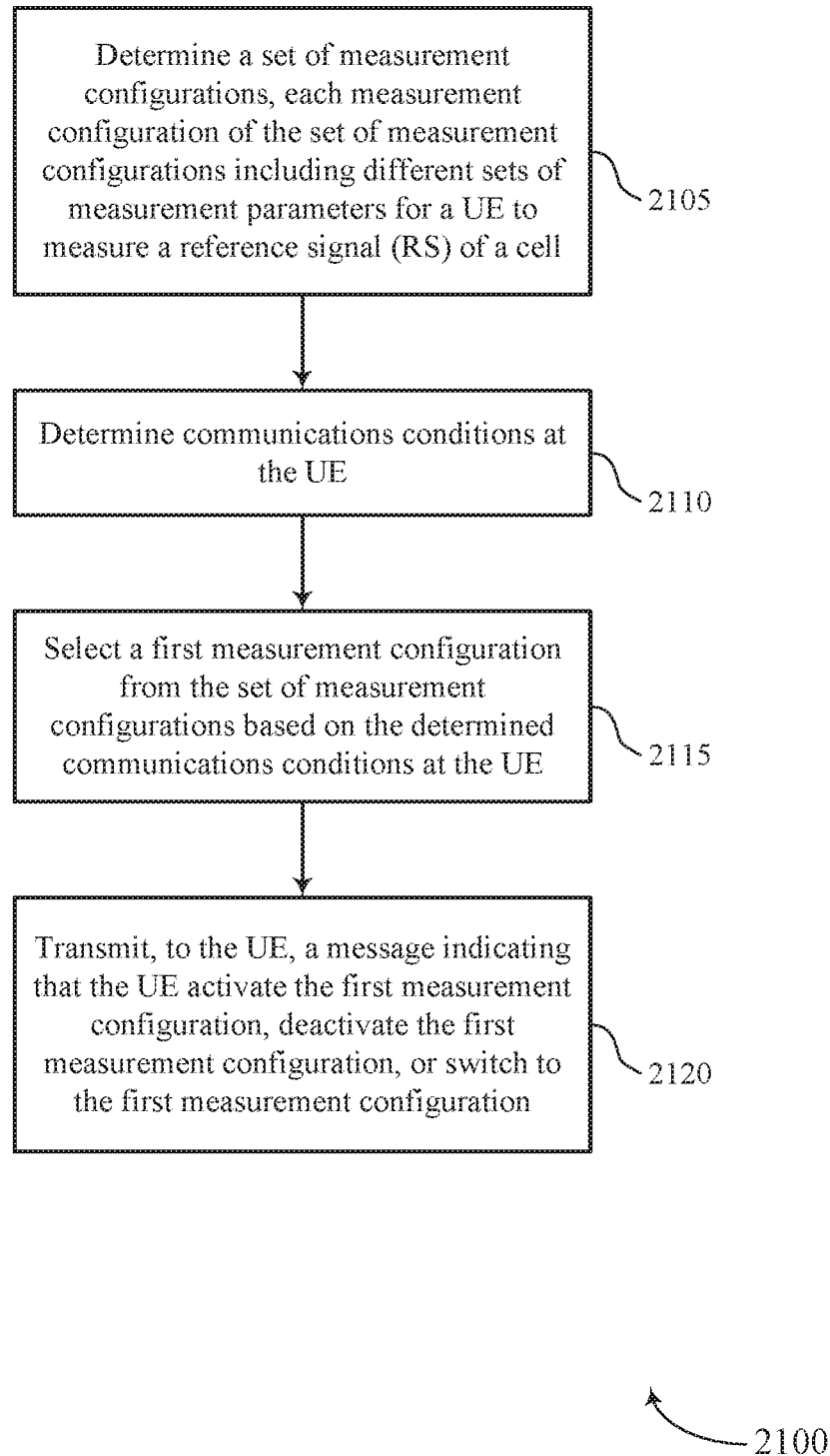

FIG. 21 shows a flowchart illustrating a method 2100 that supports adaptive monitoring in accordance with aspects of the present disclosure. The operations of method 2100 may be implemented by a base station 105 or its components as described herein. For example, the operations of method 2100 may be performed by a measurement configuration manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2105, the base station may determine a set of measurement configurations, each measurement configuration of the set of measurement configurations including different sets of measurement parameters for a UE 115 to measure a RS of a cell. The operations of 2105 may be performed according to the methods described herein. In some examples, aspects of the operations of 2105 may be performed by a measurement parameter identifier as described with reference to FIGS. 11 through 14.

At 2110, the base station may determine communications conditions at the UE 115. The operations of 2110 may be performed according to the methods described herein. In some examples, aspects of the operations of 2110 may be performed by a Condition Manager as described with reference to FIGS. 11 through 14.

At 2115, the base station may select a first measurement configuration from the set of measurement configurations based on the determined communications conditions at the UE 115. The operations of 2115 may be performed according to the methods described herein. In some examples, aspects of the operations of 2115 may be performed by a measurement parameter identifier as described with reference to FIGS. 11 through 14.

At 2120, the base station may transmit, to the UE 115, a message indicating that the UE 115 activate the first measurement configuration, deactivate the first measurement configuration, or switch to the first measurement configuration. The operations of 2120 may be performed according to the methods described herein. In some examples, aspects of the operations of 2120 may be performed by a measurement controller as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Embodiment 1: A method for wireless communication at a UE, comprising: receiving, from a base station, a first message indicating a plurality of measurement configurations, each measurement configuration of the plurality of measurement configurations comprising different sets of measurement parameters used for measuring a RS of a cell; receiving, from the base station, a second message indicating that the UE activate a first measurement configuration, deactivate the first measurement configuration, or switch to the first measurement configuration, wherein the first measurement configuration is from the plurality of measurement configurations; and determining a measurement reporting scheme based at least in part on the indication to activate, deactivate, or switch to the first measurement configuration.

Embodiment 2: The method of embodiment 1, further comprising: determining a set of measurement parameters of the first measurement configuration based at least in part on the second message indicating that the UE activate the first measurement configuration; performing measurements of the RS in accordance with the determined set of measurement parameters; and transmitting a measurement report to the base station comprising measurements of the RS based on the measurement reporting scheme.

Embodiment 3: The method of embodiments 1 or 2, further comprising: identifying that the set of measurement parameters comprises an SMTC window configuration selected from a plurality of SMTC window configurations, the SMTC window configuration comprising a SMTC window periodicity, or a SMTC window size, or a SMTC window offset, or a combination thereof.

Embodiment 4: The method of embodiments 1 to 3 further comprising: identifying that the set of measurement parameters comprises a measurement gap configuration selected from a plurality of measurement gap configurations, the measurement gap configuration comprising a measurement gap periodicity, or a measurement gap size, or a combination thereof.

Embodiment 5: The method of embodiments 1 to 4, further comprising: identifying that the set of measurement parameters comprises an RS measurement configuration for performing measurements of the RS of the cell, the RS measurement configuration comprising a measurement periodicity, or a measurement window size, or a combination thereof.

Embodiment 6: The method of embodiments 1 to 5, wherein the RS measurement configuration corresponds to a configuration of the RS of the cell or is independent of the configuration of the RS of the cell.

Embodiment 7: The method of embodiments 1 to 6, wherein the RS measurement configuration indicates different types of RSs to be measured.

Embodiment 8: The method of embodiments 1 to 7, further comprising: identifying that the set of measurement parameters comprises a set of beams used for monitoring the RS, or an activation of inter-frequency measurements, or a deactivation of inter-frequency measurements, or a combination thereof.

Embodiment 9: The method of embodiments 1 or 2 to 8, further comprising: performing measurements of the RS using the first measurement configuration; and stopping measurements of the RS using the first measurement configuration based at least in part on the second message indicating that the UE deactivate the first measurement configuration.

Embodiment 10: The method of embodiments 1 or 2 to 8, further comprising: performing measurements of the RS using a second measurement configuration; switching to the first measurement configuration based at least in part on the second message indicating that the UE switch to the first measurement configuration; determining a set of measurement parameters of the first measurement configuration, wherein the set of measurement parameters of the first measurement configuration is different from a set of measurement parameters of the second measurement configuration; performing measurements of the RS in accordance with the determined set of measurement parameters; and transmitting a measurement report to the base station comprising measurements of the RS based on the measurement reporting scheme.

Embodiment 11: The method of embodiments 1 to 10, wherein the first message indicating the plurality of measurement configurations comprises indicating the first measurement configuration for measuring the RS of the cell, wherein the second message further indicates that the UE, activate a first set of measurement parameters of the first measurement configuration, deactivate the first set of measurement parameters of the first measurement configuration, or switch to the first set of measurement parameters of the first measurement configuration, and wherein the determining the measurement reporting scheme is based at least in part on the indication to activate, deactivate, or switch to the first set of measurement parameters.

Embodiment 12: The method of embodiment 11, further comprising: determining a periodicity of the first set of measurement parameters based at least in part on the second message indicating that the UE activate the first set of measurement parameters; performing measurements of the RS in accordance with the determined periodicity of the first set of measurement parameters; and transmitting a measurement report to the base station comprising measurements of the RS based on the measurement reporting scheme.

Embodiment 13: The method of embodiments 11 or 12, further comprising: determining one or more measurement occasions of the first set of measurement parameters based at least in part on the second message indicating that the UE activate the first set of measurement parameters; performing measurements of the RS in accordance with the determined one or more measurement occasions; and transmitting a measurement report to the base station comprising measurements of the RS based on the measurement reporting scheme.

Embodiment 14: The method of embodiment 11, further comprising: performing measurements of the RS using the first set of measurement parameters; and stopping measurements of the RS using the first set of measurement parameters based at least in part on the second message indicating that the UE deactivate the first set of measurement parameters.

Embodiment 15: The method of embodiment 11, further comprising: performing measurements of the RS using a second set of measurement parameters of the measurement configuration; switching from the second set of measurement parameters to the first set of measurement parameters based at least in part on the second message indicating that the UE switch to the first set of measurement parameters, wherein the first set of measurement parameters has a different periodicity than a periodicity of the second set of measurement parameters, or has a different one or more measurement occasions than measurement occasions of the second set of measurement parameters, or a combination thereof; performing measurements of the RS using the first set of measurement parameters; and transmitting a measurement report to the base station comprising measurements of the RS based on the measurement reporting scheme.

Embodiment 16: The method of embodiments 1 to 15, wherein receiving the first message comprises: receiving the first message via RRC signaling.

Embodiment 17: The method of embodiments 1 to 16, wherein receiving the second message comprises: receiving the second message via DCI, or via a MAC-CE, or via a different carrier, or via a BW P, or a combination thereof.

Embodiment 18: The method of embodiments 1 to 17, further comprising: transmitting an ACK in response to receiving the second message.

Embodiment 19: The method of embodiments 1 to 18, wherein the RS comprises at least one of a CSI-RS, or a SSB.

Embodiment 20: The method of embodiments 1 to 19, wherein measuring the RS of the cell is for RRM procedures, or RLM procedures, or beam management, or a combination thereof.

Embodiment 21: An apparatus comprising at least one means for performing a method of any of embodiments 1 to 20.

Embodiment 22: An apparatus for wireless communications comprising a processor; memory in electronic communication with the processor; and instructions stored in the memory and executable by the processor to cause the apparatus to perform a method of any of embodiments 1 to 20.

Embodiment 23: A non-transitory computer-readable medium storing code for wireless communications, the code comprising instructions executable by a processor to perform a method of any of embodiments 1 to 20.

Embodiment 22: A method for wireless communication at a UE, comprising: receiving, from a base station, a message indicating a measurement configuration for measuring a RS of a cell; performing measurements of the RS in accordance with a first periodicity of the measurement configuration; entering into a DRX mode; and performing measurements of the RS of the cell in accordance with a second periodicity of the measurement configuration and based at least in part on the DRX mode, the first periodicity being different from the second periodicity.

Embodiment 23: The method of embodiment 22, further comprising: exiting the DRX mode; and performing measurements of the RS in accordance with the first periodicity, wherein the first periodicity is shorter than the second periodicity.

Embodiment 24: The method of embodiments 22 or 23, wherein the second periodicity is associated with a periodicity of the DRX mode.

Embodiment 25: The method of embodiments 22 to 24, wherein measurement occasions corresponding to the second periodicity are based at least in part on a periodicity of the DRX mode.

Embodiment 26: An apparatus comprising at least one means for performing a method of any of embodiments 22 to 25.

Embodiment 27: An apparatus for wireless communications comprising a processor; memory in electronic communication with the processor; and instructions stored in the memory and executable by the processor to cause the apparatus to perform a method of any of embodiments 22 to 25.

Embodiment 28: A non-transitory computer-readable medium storing code for wireless communications, the code comprising instructions executable by a processor to perform a method of any of embodiments 22 to 25.

Embodiment 29: A method for wireless communication at a base station, comprising: determining a plurality of measurement configurations, each measurement configuration of the plurality of measurement configurations comprising different sets of measurement parameters for a UE to measure a RS of a cell; determining communications conditions at the UE; selecting a first measurement configuration from the plurality of measurement configurations based at least in part on the determined communications conditions at the LT; and transmitting, to the UE, a message indicating that the UE activate the first measurement configuration, deactivate the first measurement configuration, or switch to the first measurement configuration.

Embodiment 30: The method of embodiment 29, further comprising: transmitting, to the UE, a first message indicating the plurality of measurement configurations, wherein the first message is transmitted via RRC signaling.

Embodiment 31: The method of embodiments 29 or 30, further comprising: receiving, from the UE, a measurement report based at least in part on a set of measurement parameters of the first measurement configuration, wherein the message indicates that the UE activate the first measurement configuration.

Embodiment 32: The method of embodiments 29 to 31, wherein the set of measurement parameters comprises a SSB SMTC window configuration selected from a plurality of SMTC window configurations, the first SMTC window configuration including a SMTC window periodicity, or a SMTC window size, or a SMTC window offset, or a combination thereof.

Embodiment 33: The method of embodiments 29 to 32, wherein the set of measurement parameters comprises a first measurement gap configuration selected from a plurality of measurement gap configurations, the first measurement gap configuration including a measurement gap periodicity, or a measurement gap size, or a combination thereof.

Embodiment 34: The method of embodiments 29 to 33, wherein the set of measurement parameters comprises an RS measurement configuration for performing measurements of the RS of the cell, the RS measurement configuration comprising a measurement periodicity, or a measurement window size, or a combination thereof.

Embodiment 35: The method of embodiments 29 to 34, wherein the RS measurement configuration corresponds to a configuration of the RS of the cell or is independent of the configuration of the RS of the cell.

Embodiment 36: The method of embodiments 29 to 35, wherein the RS measurement configuration indicates different types of RSs to be measured.

Embodiment 37: The method of embodiments 29 to 36, wherein the set of measurement parameters comprises a set of beams used for monitoring the RS, or an activation of inter-frequency measurements, or a deactivation of inter-frequency measurements, or a combination thereof.

Embodiment 38: The method of embodiments 29 to 37, further comprising: receiving, from the UE, a first measurement report based at least in part on a set of measurement parameters of a second measurement configuration; and receiving, from the UE, a second measurement report based at least in part on a set of measurement parameters of the first measurement configuration, wherein the message indicates that the UE switch to the first measurement configuration.

Embodiment 39: The method of embodiments 29 to 38, wherein the communications conditions at the UE comprise one or more of a beam quality at the UE, or a mobility condition of the UE, or a measurement frequency of the UE, or a measurement type performed by the UE.

Embodiment 40: The method of embodiments 29 to 39, wherein transmitting the message comprises: transmitting the message via DCI, or via a MAC-CE, or via a different carrier, or via a different MVP, or a combination thereof.

Embodiment 41: The method of embodiments 29 to 40, further comprising: receiving an ACK in response to the message.

Embodiment 42: An apparatus comprising at least one means for performing a method of any of embodiments 29 to 41.

Embodiment 43: An apparatus for wireless communications comprising a processor; memory in electronic communication with the processor; and instructions stored in the memory and executable by the processor to cause the apparatus to perform a method of any of embodiments 29 to 41.

Embodiment 44: A non-transitory computer-readable medium storing code for wireless communications, the code comprising instructions executable by a processor to perform a method of any of embodiments 29 to 41.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UNITS that use E-UTRA. UTRA, E-UTRA, UMTS, LTE, UE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a base station, a radio resource control message indicating, within a single information element of the radio resource control message, a plurality of measurement configurations, each measurement configuration of the plurality of measurement configurations indicated by the radio resource control message comprising different sets of measurement parameters used for measuring a reference signal (RS) of a cell;
    transmitting, to the base station, signaling indicative of communications conditions at the UE;
    receiving, from the base station, a control message indicating that the UE switch to a first measurement configuration, wherein the first measurement configuration is from the plurality of measurement configurations, and wherein receiving the control message indicating that the UE switch to the first measurement configuration is based at least in part on transmitting the signaling indicative of communications conditions at the UE; and
    determining a measurement reporting scheme based at least in part on the control message indicating that the UE switch to the first measurement configuration.

2. The method of claim 1, further comprising:
    determining a set of measurement parameters of the first measurement configuration based at least in part on a control message indicating that the UE activate the first measurement configuration;
    performing measurements of the RS in accordance with the determined set of measurement parameters; and
    transmitting a measurement report to the base station comprising measurements of the RS based on the measurement reporting scheme.

3. The method of claim 2, further comprising:
    identifying that the set of measurement parameters comprises a synchronization signal block (SSB) measurement timing configuration (SMTC) window configuration selected from a plurality of SMTC window configurations, the SMTC window configuration comprising a SMTC window periodicity, or a SMTC window size, or a SMTC window offset, or a combination thereof.

4. The method of claim 2, further comprising:
    identifying that the set of measurement parameters comprises a measurement gap configuration selected from a plurality of measurement gap configurations, the measurement gap configuration comprising a measurement gap periodicity, or a measurement gap size, or a combination thereof.

5. The method of claim 2, further comprising:
    identifying that the set of measurement parameters comprises an RS measurement configuration for performing measurements of the RS of the cell, the RS measurement configuration comprising a measurement periodicity, or a measurement window size, or a combination thereof.

6. The method of claim 5, wherein the RS measurement configuration corresponds to a configuration of the RS of the cell or is independent of the configuration of the RS of the cell.

7. The method of claim 5, wherein the RS measurement configuration indicates different types of RSs to be measured.

8. The method of claim 2, further comprising:
identifying that the set of measurement parameters comprises a set of beams used for monitoring the RS, or an activation of inter-frequency measurements, or a deactivation of inter-frequency measurements, or a combination thereof.

9. The method of claim 1, further comprising:
performing measurements of the RS using the first measurement configuration; and
stopping measurements of the RS using the first measurement configuration based at least in part on a control message indicating that the UE deactivate the first measurement configuration.

10. The method of claim 1, further comprising:
performing measurements of the RS using a second measurement configuration;
switching to the first measurement configuration based at least in part on the control message indicating that the UE switch to the first measurement configuration;
determining a set of measurement parameters of the first measurement configuration, wherein the set of measurement parameters of the first measurement configuration is different from a set of measurement parameters of the second measurement configuration;
performing measurements of the RS in accordance with the determined set of measurement parameters of the first measurement configuration; and
transmitting a measurement report to the base station comprising measurements of the RS based on the measurement reporting scheme.

11. The method of claim 1, wherein:
the radio resource control message indicating the plurality of measurement configurations comprises an indication of the first measurement configuration for measuring the RS of the cell;
the control message further indicates that the UE activate a first set of measurement parameters of the first measurement configuration, deactivate the first set of measurement parameters of the first measurement configuration, or switch to the first set of measurement parameters of the first measurement configuration; and
the determining the measurement reporting scheme is based at least in part on the control message indicating that the UE activate, deactivate, or switch to the first set of measurement parameters.

12. The method of claim 11, further comprising:
determining a periodicity of the first set of measurement parameters based at least in part on the control message indicating that the UE activate the first set of measurement parameters;
performing measurements of the RS in accordance with the determined periodicity of the first set of measurement parameters; and
transmitting a measurement report to the base station comprising measurements of the RS based on the measurement reporting scheme.

13. The method of claim 11, further comprising:
determining one or more measurement occasions of the first set of measurement parameters based at least in part on the control message indicating that the UE activate the first set of measurement parameters;
performing measurements of the RS in accordance with the determined one or more measurement occasions; and
transmitting a measurement report to the base station comprising measurements of the RS based on the measurement reporting scheme.

14. The method of claim 11, further comprising:
performing measurements of the RS using the first set of measurement parameters; and
stopping measurements of the RS using the first set of measurement parameters based at least in part on the control message indicating that the UE deactivate the first set of measurement parameters.

15. The method of claim 11, further comprising:
performing measurements of the RS using a second set of measurement parameters of the measurement configuration;
switching from the second set of measurement parameters to the first set of measurement parameters based at least in part on the control message indicating that the UE switch to the first set of measurement parameters, wherein the first set of measurement parameters has a different periodicity than a periodicity of the second set of measurement parameters, or has a different one or more measurement occasions than measurement occasions of the second set of measurement parameters, or a combination thereof;
performing measurements of the RS using the first set of measurement parameters; and
transmitting a measurement report to the base station comprising measurements of the RS based on the measurement reporting scheme.

16. The method of claim 1, wherein receiving the control message comprises:
receiving the control message via downlink control information (DCI), or via a medium access control (MAC) control element (CE), or via a different carrier, or via a different bandwidth part (BWP), or a combination thereof.

17. The method of claim 1, further comprising:
transmitting an acknowledgement (ACK) in response to receiving the control message.

18. A method for wireless communication at a user equipment (UE), comprising:
receiving, from a base station, a message indicating a measurement configuration for measuring a reference signal (RS) of a cell;
performing measurements of the RS in accordance with a first periodicity of the measurement configuration, wherein the first periodicity is associated with an operating mode that is different from a discontinuous reception (DRX) mode;
entering into the DRX mode; and
performing measurements of the RS of the cell in accordance with a second periodicity of the measurement configuration and based at least in part on the DRX mode, the first periodicity being different from the second periodicity.

19. The method of claim 18, further comprising:
exiting the DRX mode; and
performing measurements of the RS in accordance with a third periodicity.

20. The method of claim 18, wherein the second periodicity is associated with a periodicity of the DRX mode.

21. The method of claim 18, wherein measurement occasions corresponding to the second periodicity are based at least in part on a periodicity of the DRX mode.

22. A method for wireless communication at a base station, comprising:
determining a plurality of measurement configurations, each measurement configuration of the plurality of measurement configurations comprising different sets of measurement parameters for a user equipment (UE) to measure a reference signal (RS) of a cell;

determining, by the base station, communications conditions at the UE;

selecting a first measurement configuration from the plurality of measurement configurations based at least in part on the determined communications conditions at the UE; and transmitting, to the UE, a message indicating that the UE activate the first measurement configuration, deactivate the first measurement configuration, or switch to the first measurement configuration.

23. The method of claim 22, further comprising:
transmitting, to the UE, a first message indicating the plurality of measurement configurations, wherein the first message is transmitted via radio resource control (RRC) signaling.

24. The method of claim 22, further comprising:
receiving, from the UE, a measurement report based at least in part on a set of measurement parameters of the first measurement configuration, wherein the message indicates that the UE activate the first measurement configuration.

25. The method of claim 24, wherein:
the set of measurement parameters comprises a synchronization signal block (SSB) measurement timing configuration (SMTC) window configuration selected from a plurality of SMTC window configurations, the first SMTC window configuration including a SMTC window periodicity, or a SMTC window size, or a SMTC window offset, or a combination thereof.

26. The method of claim 24, wherein the set of measurement parameters comprises a first measurement gap configuration selected from a plurality of measurement gap configurations, the first measurement gap configuration including a measurement gap periodicity, or a measurement gap size, or a combination thereof.

27. The method of claim 24, wherein the set of measurement parameters comprises an RS measurement configuration for performing measurements of the RS of the cell, the RS measurement configuration comprising a measurement periodicity, or a measurement window size, or a combination thereof.

28. The method of claim 24, wherein the set of measurement parameters comprises a set of beams used for monitoring the RS, or an activation of inter-frequency measurements, or a deactivation of inter-frequency measurements, or a combination thereof.

29. The method of claim 22, further comprising:
receiving, from the UE, a first measurement report based at least in part on a set of measurement parameters of a second measurement configuration; and receiving, from the UE, a second measurement report based at least in part on a set of measurement parameters of the first measurement configuration, wherein the message indicates that the UE switch to the first measurement configuration.

30. An apparatus for wireless communication, comprising:
a processor, memory in electronic communication with the processor; and instructions stored in the memory and executable by the processor to cause the apparatus to:
receive, from a base station, a radio resource control message indicating, within a single information element of the radio resource control message, a plurality of measurement configurations, each measurement configuration of the plurality of measurement configurations indicated by the radio resource control message comprising different sets of measurement parameters used for measuring a reference signal (RS) of a cell;

transmit, to the base station, signaling indicative of communications conditions at a user equipment (UE);

receive, from the base station, a control message indicating that the UE switch to a first measurement configuration, wherein the first measurement configuration is from the plurality of measurement configurations, and wherein receiving the control message indicating that the UE switch to the first measurement configuration is based at least in part on transmitting the signaling indicative of communications conditions at the UE; and determine a measurement reporting scheme based at least in part on the control message indicating that the UE switch to the first measurement configuration.

* * * * *